United States Patent
Albrecht et al.

(10) Patent No.: US 6,715,798 B2
(45) Date of Patent: Apr. 6, 2004

(54) HIGH-PRESSURE FLUID-FLOW SYSTEM HAVING COMPACT TWO-BOLT AND FOUR-BOLT FLANGED AND MODULAR CONNECTORS

(76) Inventors: David E. Albrecht, 1383 Granary Rd., Blue Bell, PA (US) 19422; David E. Albrecht Jr., 1383 Granary Rd., Blue Bell, PA (US) 19422

( * ) Notice: Subject to any disclaimer, the term of this patent is extended or adjusted under 35 U.S.C. 154(b) by 0 days.

(21) Appl. No.: 10/061,005

(22) Filed: Jan. 30, 2002

(65) Prior Publication Data

US 2002/0153722 A1 Oct. 24, 2002

Related U.S. Application Data

(62) Division of application No. 09/177,771, filed on Oct. 23, 1998.

(51) Int. Cl.[7] ................................................. F16L 39/00
(52) U.S. Cl. .................... 285/124.1; 285/414; 285/405
(58) Field of Search ........................... 285/294.3, 296.1, 285/405, 412, 563, 368, 124.1, 201, 414

(56) References Cited

U.S. PATENT DOCUMENTS

| | | | |
|---|---|---|---|
| 1,972,445 A | 9/1934 | Houser | |
| 2,302,617 A | 11/1942 | Little | |
| 2,569,378 A | 9/1951 | Hood | |
| 2,871,881 A | 2/1959 | Hewson | |
| 3,001,804 A | 9/1961 | Tomlinson et al. | |
| 4,466,290 A | 8/1984 | Frick | |
| 4,738,276 A | 4/1988 | Adams | |
| 4,874,190 A | * 10/1989 | Reynolds | 285/142.1 |
| 5,000,488 A | * 3/1991 | Albrecht | 285/12 |
| 5,000,490 A | * 3/1991 | Albrecht | 285/39 |
| 5,018,769 A | 5/1991 | Albrecht | |
| 5,301,984 A | 4/1994 | Farris | |
| 5,338,075 A | 8/1994 | Albrecht | |
| 5,419,256 A | * 5/1995 | Pollich | 101/485 |
| 6,467,820 B1 | * 10/2002 | Albrecht et al. | 285/368 |

* cited by examiner

Primary Examiner—Lynne H. Browne
Assistant Examiner—Aaron Dunwoody
(74) Attorney, Agent, or Firm—William H. Eilberg

(57) ABSTRACT

A one-piece, flanged, fluid-flow connector for connecting tube, pipe, hose or the like to a port face includes a base having a flat port face on one end, and a connection piece fixed to and extending from the other end. At least four tabs extend from the base, the tabs having apertures for mounting the connector. The base includes a reinforcement portion that transitions continuously from a lesser thickness adjacent the tabs to a greater thickness adjacent to the connection piece. The connector makes it feasible to provide a one-piece, four-bolt connector which occupies substantially less space than a comparable connector of the prior art, but which handles at least the same fluid pressures.

25 Claims, 28 Drawing Sheets

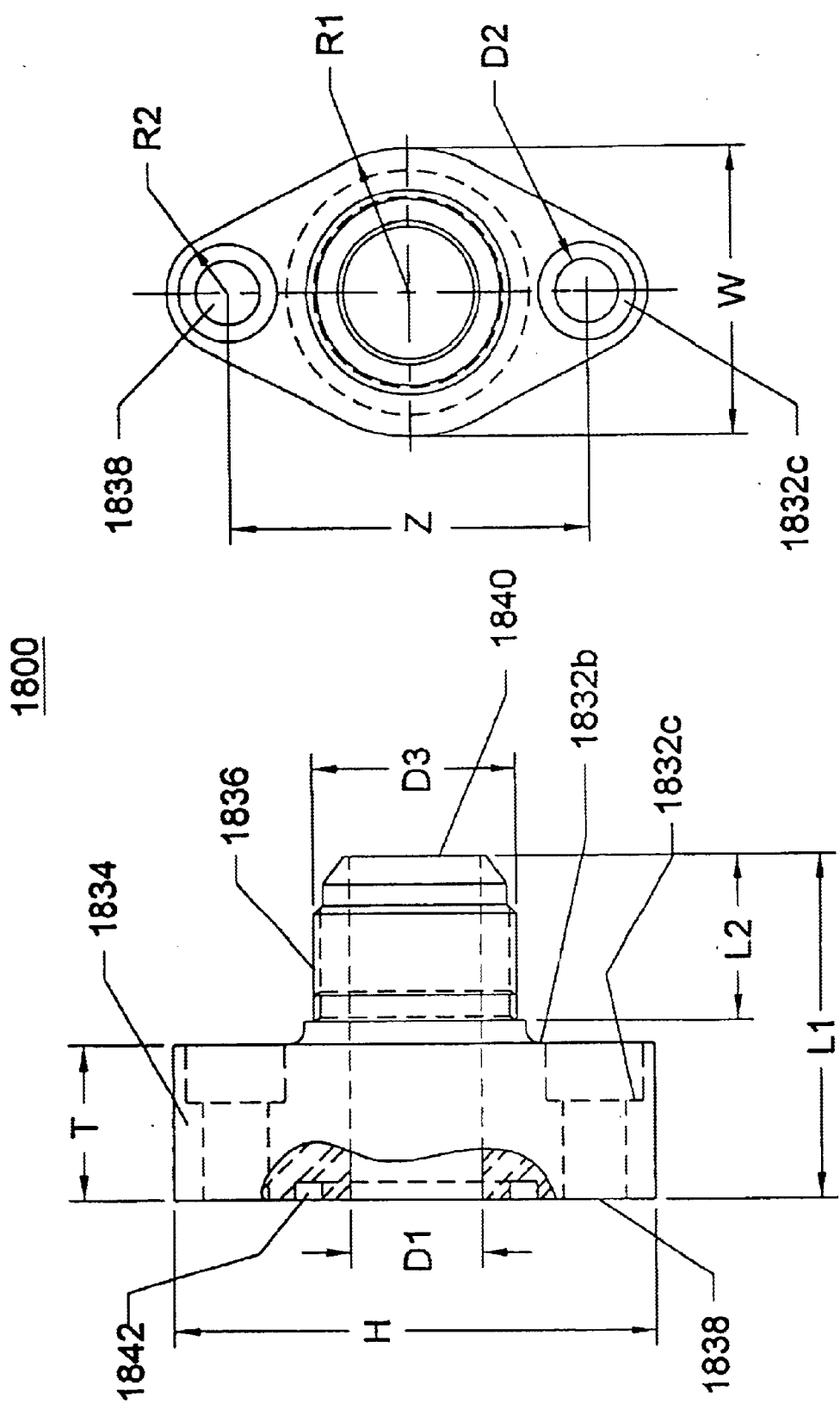

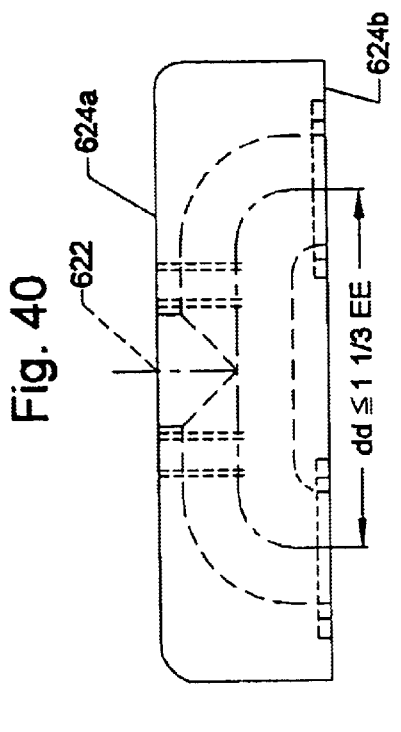
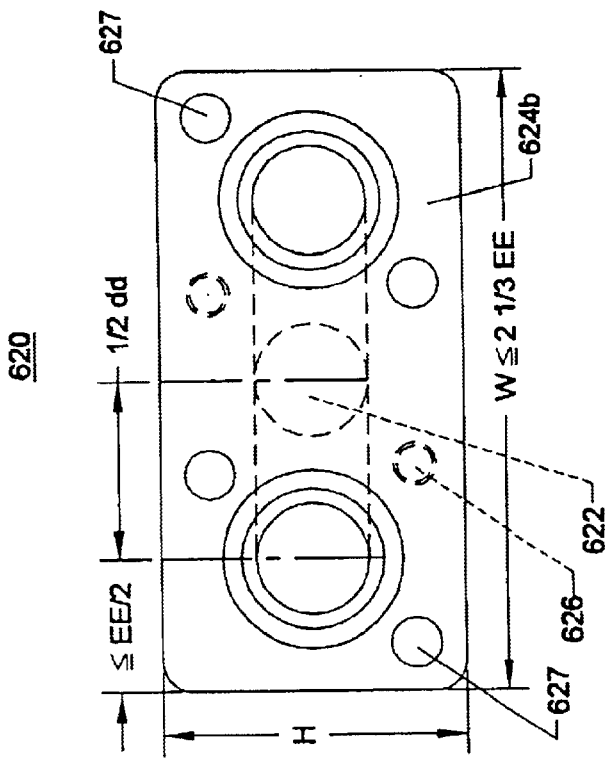
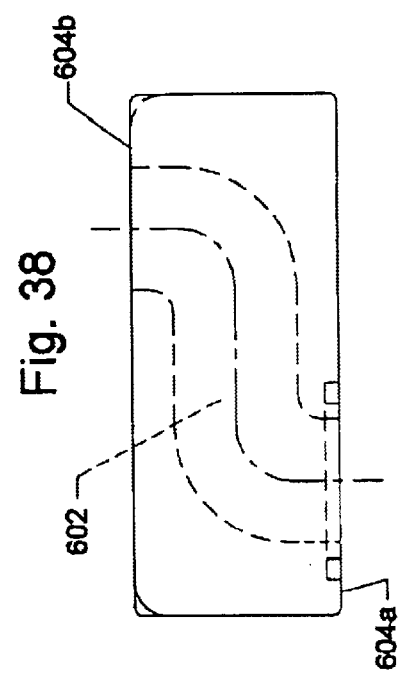
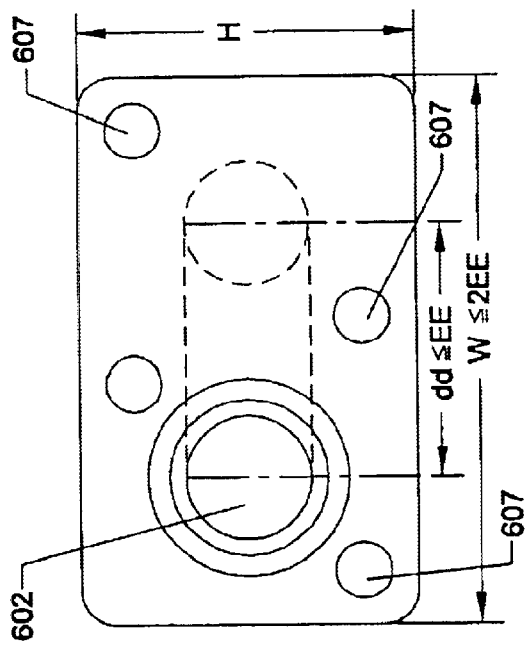

HIGH-PRESSURE FLUID-FLOW SYSTEM HAVING COMPACT TWO-BOLT AND FOUR-BOLT FLANGED AND MODULAR CONNECTORS

CROSS-REFERENCE TO PRIOR APPLICATION

This is a division of U.S. patent application Ser. No. 09/177,771, filed Oct. 23, 1998, entitled HIGH-PRESSURE FLUID-FLOW SYSTEM HAVING COMPACT TWO-BOLT AND FOUR-BOLT FLANGED AND MODULAR CONNECTORS.

FIELD OF THE INVENTION

The present invention relates to a compact, mechanically-connected, fluid-flow system having compact port-face tube, pipe and hose connectors. More particularly, the system has compact two-bolt and four-bolt flanged and modular connectors which meet or exceed the working pressure specified in SAE standard J518 and which fit within the minimum pad width specified in SAE standard J518.

BACKGROUND OF THE INVENTION

Four-bolt, split-flange connectors, such as illustrated in SAE standard J518, are known for connecting tube, pipe, hose or the like to a fluid-flow port face on an adapter plate, pump, or the like. These connectors are intended for use in hydraulic systems, or in industrial and commercial products, where it is desired to avoid the use of threaded connectors.

Referring to FIGS. 1 and 2 (prior art), known split-flange connectors 8 have a flanged head fitting 10, two split-flange clamp halves 18, and four bolts 14 which are inserted through the clamp halves 18 and into threaded apertures 22 in the face plate 24. The bolts 14 properly align the connector 8 with the port 6. The four-bolt, split-flange connector 8 may optionally include lock washers 16 and an O-ring seal 20 on its port face mating surface.

In mechanical, fluid-flow systems, it is common to design several fluid-flow ports 6 adjacent one another.

The proximity with which fluid-flow ports 6 may be arranged is directly related to the diameter of the port and the widthwise and lengthwise dimensions of the prior art split-flange connectors 8. The Engineering Society for Advancing Mobility Land Sea Air and Space (SAE) has developed a standard which covers the specifications for the flanged head 10 and split-flange clamp halves 18 applicable to the aforementioned prior art four-bolt, split-flange hydraulic connectors 8.

SAE standard J518 covers complete general and dimensional specifications for the port 6, flange head 10 and split-flange clamp halves 18 applicable to four-bolt, split-flange type tube, pipe and hose connectors. In addition to specifying the dimensions of four-bolt hydraulic flanged connectors and port dimensions for bolted flange connectors, SAE standard J518 specifies the material, finish, workmanship, material properties (minimum yield and minimum elongation), and maximum working pressure. Code 61 of SAE standard J518 recites the dimensions of standard pressure hydraulic flanged connectors while Code 62 recites the dimensions of high pressure hydraulic flanged connectors.

The minimum and recommended dimensions between adjacent fluid-flow ports 6 for bolted flange connectors are specified in SAE standard J518 with reference to a drawing reproduced substantially herein as FIG. 3. SAE standard J518 specifies dimensions BB, CC, and DD as the minimum vertical and horizontal distances between the center of adjacent fluid-flow ports 6. The recommended distances BB, CC, and DD are based on the recommended dimensions of the above-described four-bolt hydraulic flanged connectors and factor in a 0.06 inch clearance between flanges, dimensionally on the high limit, when the same size flanges are used on adjacent ports. SAE standard J518 also specifies the minimum pad width EE of the port face for both the standard pressure series Code 61 and high pressure series Code 62.

As used herein, the term "pad" refers to the surface of a block, pump, or the like immediately surrounding a port 6 to which a flanged hydraulic connector is attached. As used herein, the term "footprint" is used to describe the projected area of the mounting surface of the connector which abuts the "pad" of the block, pump, etc.

Referring to FIGS. 1–3 (prior art), the recommended pad width FF of the hydraulic flanged connector is much wider than the minimum pad width EE. In order to design a high-pressure fluid flow system more compact than the prior art, it would be desirable to provide a flanged connector having a widthwise dimension which is equal to or less than the minimum pad width EE so that the port dimensions CC and DD can be reduced.

In order to satisfy the aforementioned objects, the widthwise dimension of prior art two-bolt or four-bolt, split-flange connectors cannot simply be reduced. A reduction in the widthwise dimension would likely reduce the maximum working pressure of the connector below the value specified in SAE standard J518. Therefore, it is a further object of the invention to provide a compact connector which requires only the minimum pad width EE but which also meets or exceeds the working pressure specified in SAE standard J518.

SUMMARY OF THE INVENTION

The present invention provides a flanged connector having a widthwise dimension W which is less than the recommended pad width FF, preferably equal to or less than the minimum pad width EE, so that the port dimensions CC and DD can be reduced, and which also can meet or exceed the working pressure specified in SAE standard J518.

A one-piece, flanged fluid-flow connector of the invention can be used for connecting tube, pipe, hose or the like to a port face having a port diameter D1. The connector has an overall length L1.

The flanged connector has base portion having a height H, width W, a generally-flat port face mounting surface on one end, a generally cylindrical connection piece at the other end, and a reinforcement portion intermediate the port face mounting surface and the connection piece. The port face mounting surface may have an annular recess formed therein which is designed to receive an "O"-ring to seal the connector on a desired port face. The reinforcement portion may comprise a generally-conical, rectangular or ribbed extension.

A central, elongate, cylindrical channel extends lengthwise through the connector. The central channel has a nominal port diameter D1 at the port face mounting surface.

The base has a maximum width W which is less than the minimum pad width FF, preferably less than or equal to the minimum pad width EE, specified in SAE standard J518 corresponding to the nominal port diameter D1 of the connector.

A generally-cylindrical connection piece is fixed to and extends from the reinforcement portion. The connection piece has means for interconnecting with a variety of elements such as a tube extension, hose, or pipe. The connection piece may have a variable length depending on the intended element to which the connector is attached. The connection piece may have a threaded outer or other surface for releasable interconnection with the desired tube, pipe, hose or the like. Alternatively, the connection piece may be permanently connected to a tube, pipe or the like by, for example, brazing, welding or swaging. The connection piece may be straight or bent to change the direction of fluid flow. The connection piece has a length L2.

A plurality of tabs are fixed to and extend outwardly from the base portion. Each of the tabs has an aperture extending therethrough. In a preferred embodiment, the (two-bolt) connector has two tabs diametrically opposed from one another on opposed sides of the central port. Alternatively, the (four-bolt) connector has two pair of tabs, each pair of tabs diametrically opposed from one another on opposed sides of the central port. The apertures are spaced apart a distance Z from one another in the two-bolt connector. The heightwise and widthwise spacing between apertures in the four-bolt connector are equal to Q and GG, respectively, as defined in SAE standard J518.

The tabs have a flat face surrounding the apertures on which the heads of fastening bolts are torqued. Preferably, the flat face comprises a semi-circular cut-out in the reinforcement portion in the area proximate the aperture.

The connector is manufactured from a high-strength structural material such as steel, iron or aluminum, or composite, preferably a medium carbon steel.

The dimensions of the connector are preferably selected such that $W \leq EE$, $D1 \leq A$, and $Z=(Q^2+GG^2)^{1/2}$ wherein EE, A, Q, O and GG are defined in SAE standard J518. The connector has nested horizontal and vertical port dimensions bb, cc, and dd corresponding to nested horizontal and vertical port dimensions BB, CC, and DD in SAE standard J518. In the two-bolt embodiment, the dimension H is approximately equal to but slightly larger than the dimension O defined in SAE standard J518; the dimension bb is at least 15% smaller than the dimension BB; the dimension cc is smaller than the dimension CC; and, the dimension dd being at least 20% smaller than the dimension DD. In the four-bolt embodiment, the dimension H is equal to or less than the dimension O defined in SAE standard J518; cc is smaller than the dimension CC and the dimension dd is at least 20% smaller than the dimension DD.

The invention also provides modular block connectors having a port face mounting surface width less than the recommended pad with FF established in SAE standard J518. Preferably, the port face mounting surface width is equal to EE, the minimum pad width specified in SAE standard J518 corresponding to the nominal port diameter D1. The port face mounting surface width may be less than EE provided the width of the footprint of the mating flange connector is less than the width of the port face mounting surface, thereby maintaining a widthwise differential between the port face mounting surface and the flange connector. The modular block connectors have fluid flow channels such as an Elbow, Tee, Cross, and other shapes.

The one-piece, block, connector for connecting flanged connectors has a plurality of mounting surfaces. Each mounting surface has a width W and a height H. A fluid-flow channel extends from one mounting surface to each of the other mounting surfaces. The fluid-flow channel may have an Elbow, Tee, or Cross shape. The channel has ports on each mounting surface. The ports have a nominal diameter D1 at the mounting surfaces. The connector has a plurality of threaded bores on each mounting surface for fastening a flanged connector to the mounting surface.

The width W of at least one mounting surface is less than the recommended pad width FF, preferably less than or equal to the minimum pad width EE, specified in SAE standard J518 corresponding to said nominal port diameter D1. The connector may have two, three, or four mounting surfaces having a width W1, W2, W3, W4 less than FF, preferably less than or equal to the minimum pad width EE, specified in SAE standard J518 corresponding to said nominal port diameter D1. The height H of the block connector is preferably equal to the dimension O specified in SAE standard J518 corresponding to the nominal diameter D1. The connector has a working pressure rating greater than or equal to the working pressure rating specified in SAE standard J518 corresponding to the nominal diameter D1.

In one embodiment, at least one mounting surface has multiple fluid flow ports thereon. Each of the ports is connected to the fluid-flow-channel. The multiple ports are spaced apart a distance dd wherein dd is less than FF specified in SAE standard J518 corresponding to said nominal port diameter D1. Preferably, the dimension dd is less than or equal to the dimension EE specified in SAE standard J518 corresponding to said nominal port diameter D1. The multiple port mounting surface has a width W2 less than or equal to n times FF, preferably less than or equal to n times EE.

In another embodiment, the connector has more than one mounting surface with multiple (N) ingredient (unconnected) fluid flow channels. Each of the fluid-flow channels extends from one mounting surface to another. The mounting surfaces have multiple (n) ports thereon. The multiple ports are spaced apart a distance dd which is equal to the dimension O specified in SAE standard J518 corresponding to said nominal port diameter D1. In another embodiment, the dimension dd is less than FF, more preferably less than or equal to EE, specified in SAE standard J518 corresponding to said nominal port diameter D1. The multiple port mounting surfaces have a width W2 less than or equal to n times O specified in SAE standard J518 corresponding to said nominal port diameter. Preferably, the multiple port surfaces have a width W2 less than n times FF, more preferably less than or equal to n times EE.

The invention also provides a stackable, one-piece, block connector for connecting flanged connectors to a port face. The stackable connector has a flange mounting surface, a port face mounting surface and a stacking surface opposite the port face mounting surface. Each surface has a width W and a height H.

A fluid-flow channel extends from the port face mounting surface to at least one other mounting surface. The fluid-flow channel may have an Elbow, Tee, Cross or other shape. The channel has ports on the port face mounting surface and the mounting surface. The port has a nominal diameter D1 at the port face mounting surfaces.

A plurality of threaded fastening bores are located on each mounting surface for fastening the flanged connector to the mounting surface. A plurality of through bores extend from the stacking surface to the port face mounting surface. Each through bore may have a counterbore in the stacking surface on the two bolt embodiment. An annular recess is formed in the port face mounting surface proximate the fluid-flow port.

The flange mounting surfaces have a height H less than or equal to the dimension O specified in SAE standard J518 corresponding to said nominal diameter D1. The width W of at least one flange mounting surface is less than FF, preferably less than or equal to the minimum pad width EE, specified in SAE standard J518 corresponding to said nominal port diameter D1. The connector has a working pressure rating greater than or equal to the working pressure rating specified in SAE standard J518 corresponding to the nominal diameter D1.

In one embodiment, the stackable connector has at least one mounting surface with multiple (n) fluid-flow ports thereon. Each of the ports are connected to the fluid-flow channel. The multiple ports are spaced apart a distance dd wherein dd is less than FF, preferably less than or equal to EE, specified in SAE standard J518 corresponding to said nominal port diameter D1. The multiple port mounting surface has a width W2 less than or equal to n times dd.

In another embodiment, the stackable connector has more than one mounting surface with multiple (n) ports thereon, each of the ports being connected to an independent (unconnected) fluid flow channel extending from one multiple port mounting surface to another. The multiple ports are spaced apart a distance dd wherein dd is equal to the dimension O specified in SAE standard J518 corresponding to said nominal port diameter D1. The multiple port mounting surfaces having a width W2 less than or equal to n times the dimension O specified in SAE standard J518 corresponding to said nominal port diameter.

Alternatively, dd is less than FF, preferably less than or equal to EE, specified in SAE standard J518 corresponding to said nominal port diameter D1. In this embodiment, the multiple port surfaces have a width W2 less than or equal to n times EE.

The invention also provides a one-piece, 180-degree flow turn around connector. The turn around connector has a single mounting surface having a width W and a height H, an input and output fluid-flow port on the mounting surface, and a 180-degree fluid-flow channel connecting the input and output ports. The ports have a nominal diameter D1 at the mounting surface. The centers of the ports are separated by a distance dd wherein dd is less than FF, preferably less than or equal to EE, specified in SAE standard J518 corresponding to the nominal port diameter.

The width W of the mounting surface is less than or equal to twice the recommended pad width FF, preferably less than or equal to twice the minimum pad width EE, specified in SAE standard J518 corresponding to said nominal port diameter D1. The height H is preferably equal to the dimension O specified in SAE standard J518 corresponding to the nominal diameter D1. The connector has a working pressure rating greater than or equal to the working pressure rating specified in SAE standard J518 corresponding to said nominal diameter D1.

A plurality of through bores extend through each mounting surface. An annular recess is formed in the port face mounting surface proximate each fluid-flow port.

The invention also provides a one-piece, 90-degree divide/combine flow connector. The divide/combine flow connector has a flange mounting surface, a port face mounting surface, a fluid-flow channel connecting the port face mounting surface and the flange mounting surface, and a plurality of through bores on the port face mounting surface. An annular recess is formed in the port face mounting surface proximate each fluid-flow port.

The flange mounting surface has a width W, a height H, and a single port having a nominal diameter D1 at the first mounting surface. The port face mounting surface has a height H and two ports having a nominal diameter up to D1 at the port face mounting surface.

The height H is preferably equal to the dimension O specified in SAE standard J518 corresponding to said nominal diameter D1. The center of the ports are spaced apart from one another a widthwise distance dd wherein dd is less than or equal to the width FF, preferably at least 20% smaller than the width FF, and more preferably less than or equal to EE, specified in SAE standard J518 corresponding to said nominal port diameter D1.

The width W of the flange mounting surface is less than FF, preferably less than or equal to the minimum pad width EE, specified in SAE standard J518 corresponding to said nominal port diameter D1. The connector has a working pressure rating greater than or equal to the working pressure rating specified in SAE standard J518 corresponding to said nominal diameter D1.

The invention also provides a one-piece, in-line divide/combine flow connector. The in-line divide/combine flow connector has a flange mounting surface having a width W, a height H, a port face mounting surface, a fluid-flow channel connecting the port face mounting surface and the flange mounting surface, a plurality of through bores on the port face mounting surface, and a plurality of threaded bores on said flange mounting surface. An annular recess is formed in the port face mounting surface proximate each fluid-flow port.

The flange mounting surface has a single port having a nominal diameter D1. The port face mounting surface has a height H and two ports having a nominal diameter up to D1. The center of the ports are spaced apart from one another a widthwise distance dd wherein the width dd is less than or equal to 1-⅓ times EE specified in SAE standard J518 corresponding to said nominal port diameter D1. The height H is preferably equal to the dimension O specified in SAE standard J518 corresponding to said nominal diameter D1. The connector has a working pressure rating greater than or equal to the working pressure rating specified in SAE standard J518 corresponding to said nominal diameter D1.

BRIEF DESCRIPTION OF THE DRAWINGS

FIG. 5b is a side elevational view with a partial section of a two-bolt connector having an increased thickness reinforcement portion in accordance with an embodiment of the invention;

FIG. 6a is a front elevational view of the connector of FIG. 5a;

FIG. 6b is a front elevational view of the connector of FIG. 5b;

FIG. 38 is a top plan view of an offset flow modular block connector in accordance with an embodiment of the invention;

FIG. 39 is a front elevational view of the connector shown in FIG. 38;

FIG. 40 is a top plan view of an in-line divide flow/combine flow modular connector in accordance with an embodiment of the invention;

FIG. 41 is a front elevational view of the connector shown in FIG. 40;

DETAILED DESCRIPTION OF PREFERRED EMBODIMENTS

Figure 2:
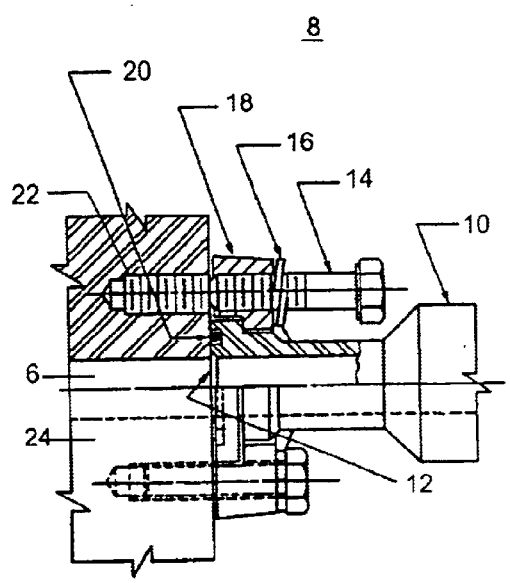
FIG. 2 is a partial cross-sectional view taken along lines Y—Y of FIG. 1 (prior art)

The high-pressure, fluid-flow system of the present invention is described below with reference to FIGS. 4–45 wherein like reference numerals are used throughout to designate like structural elements.

The one-piece, flanged connector of the present invention may have a two-bolt design 30 or a four-bolt design 130. A first embodiment of the flanged connector of the present invention is described with reference to FIGS. 4–11 which show a two-bolt flanged connector designated generally by reference numeral 30.

Figure 1:
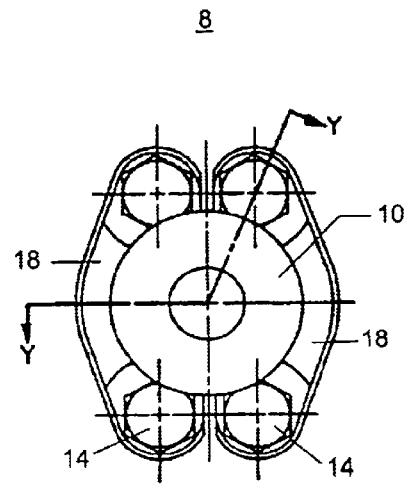
FIG. 1 is a front elevational view of an assembled split flanged connection in accordance with SAE standard J518 (prior art)
Figure 3:
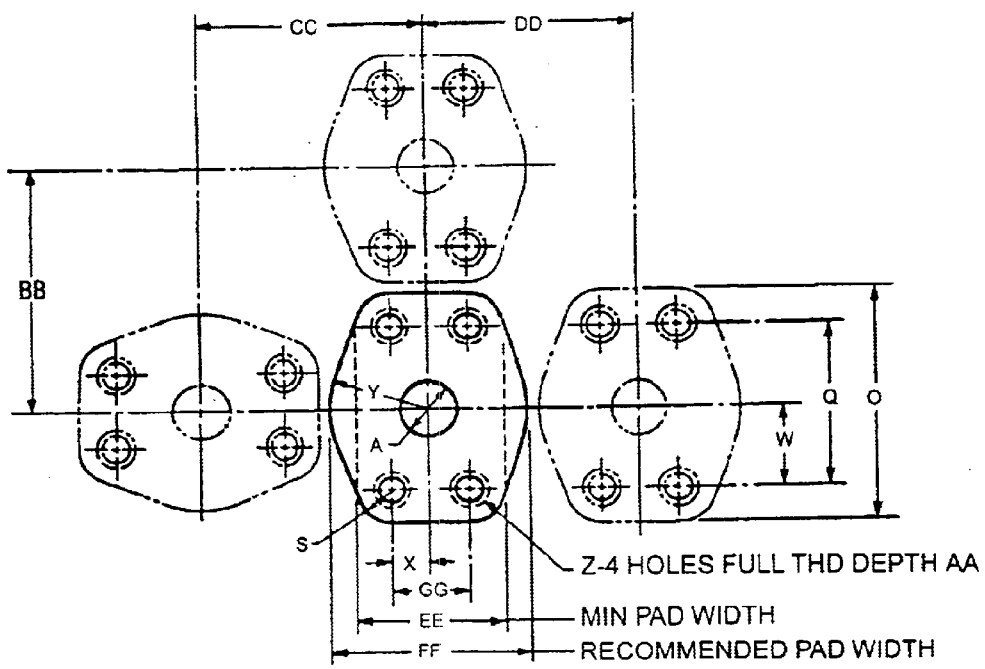
FIG. 3 is a schematic illustration of the port dimensions of hydraulic flanged, tube, pipe, and hose connections, four-bolt split flange type of SAE standard J518 (prior art)

The two-bolt, flanged connector 30 has a one-piece construction in contrast with the prior art two-piece, split-flange connector 8 illustrated in FIGS. 1–3. The connector 30 is preferably manufactured from a high-strength structural material such as steel, iron, or aluminum, or composite and preferably medium carbon steel.

Figure 4:
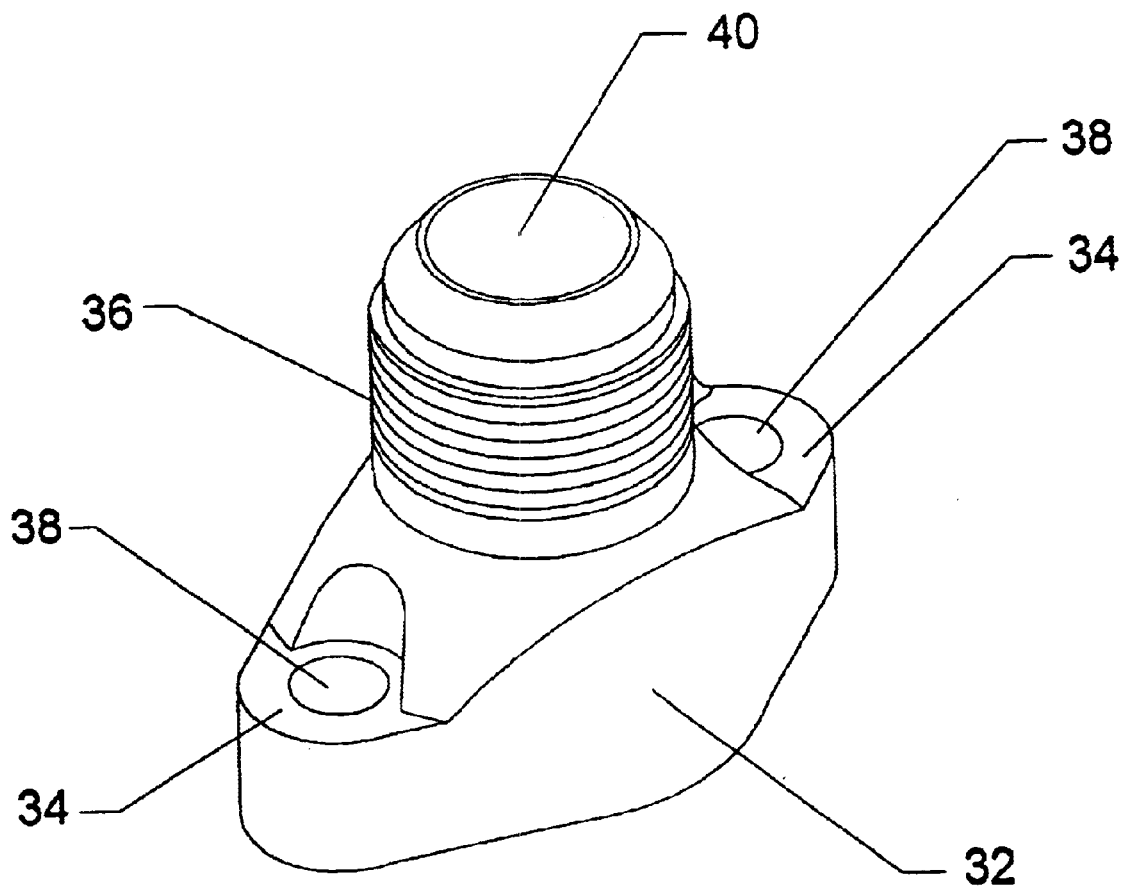
FIG. 4 is a perspective view of a two-bolt connector having a generally-conical reinforcement portion in accordance with an embodiment of the present invention.
Figure 6:
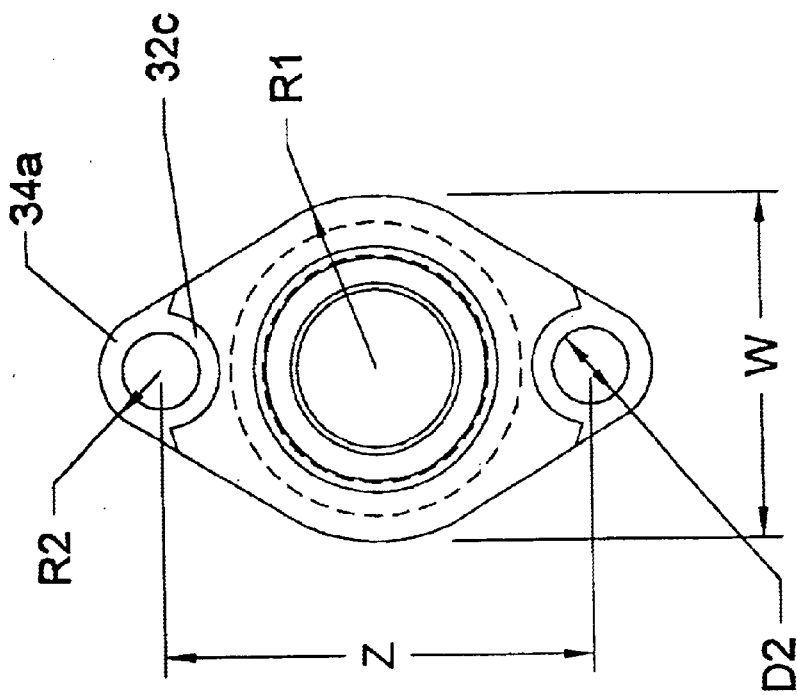
FIG. 6 is a front elevational view of the connector of FIG. 4.
Figure 5:
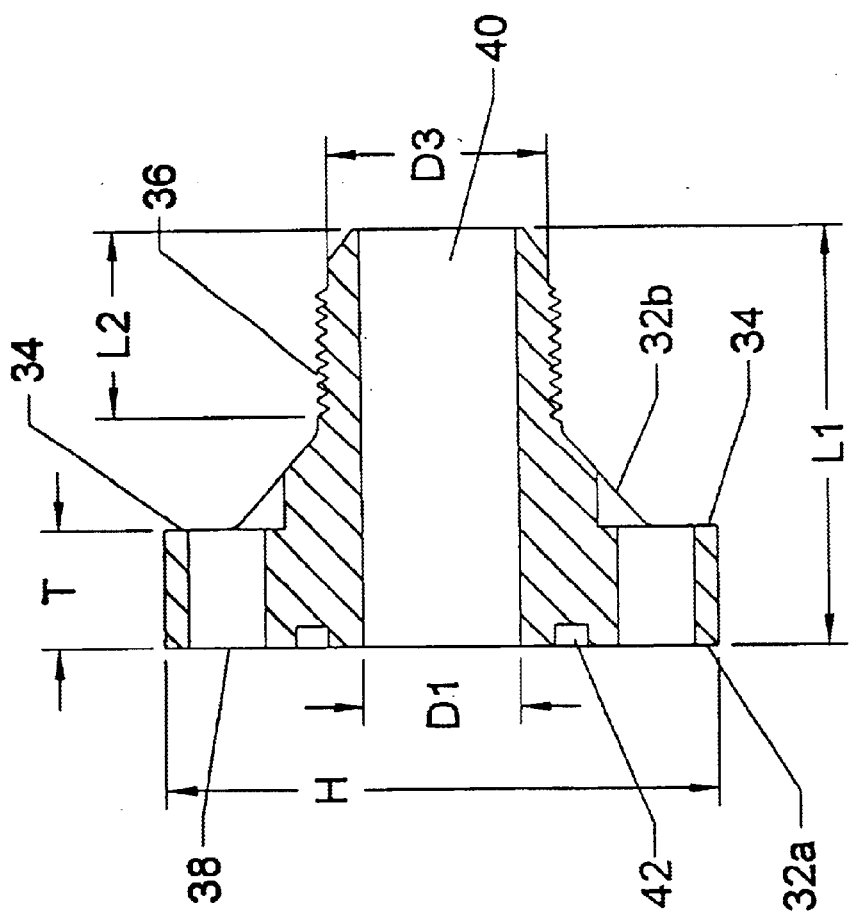
FIG. 5 is a cross-sectional view of the connector illustrated in FIG. 4.

Referring to FIGS. 4–6, the connector 30 generally has an irregularly-shaped base portion, a reinforcement portion, and a connection piece. The base portion 32 has a height H and width W as best seen in FIGS. 5 and 6. The tabs 34 (described below) have a thickness T. The connection piece 36 has a length L2 and an outer diameter D3. The connector has an overall length L1.

In one embodiment, best seen in FIGS. 4–6, the reinforcement portion comprises a lengthwise extending, generally-conical extension 32b at one end of the base. This embodiment is preferred when manufacturing small quantities of the connector 30.

Figure 6A:
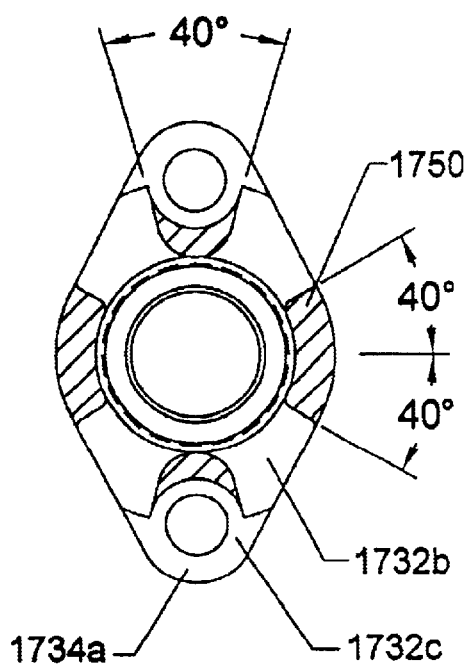
Figure 5A:
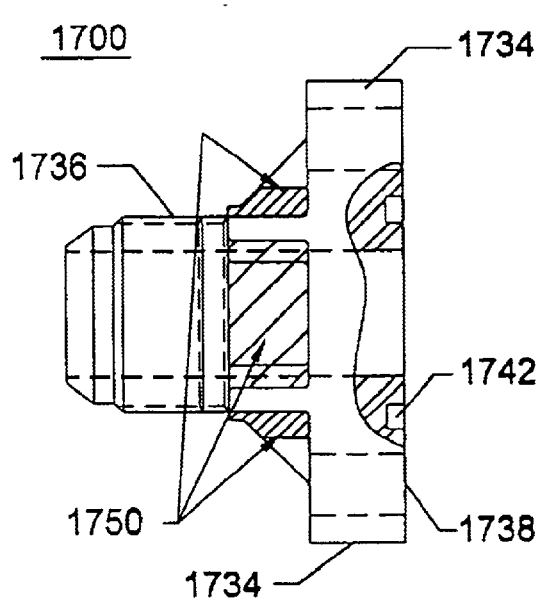
FIG. 5a is a side elevational view with a partial section of a two-bolt connector having a ribbed reinforcement portion in accordance with an embodiment of the invention.

When manufacturing large quantities of the connector 30, the conical reinforcement portion is reduced in thickness in the areas 1750 indicated by hash marks in FIGS. 5a and 6a, thereby forming a plurality or ribs 1732b. In this embodiment, it is recognized that the maximum working stress does not occur in an area midway between the two mounting bolts, but rather in areas that are rotated about 40 degrees from this centrum adjacent to the mounting bolts and at the maximum widthwise portion of the extension. Therefore, the ribs 1732b are located in the areas shown in FIGS. 5a and 6a.

In a further embodiment shown in FIGS. 5b and 6b, the reinforcement portion comprises an enlarged thickness T extension 1832b of the base portion 1832. Due to the enlarged thickness of the base portion 1832, and tab 1834 (described below) has a counterbore 1832c in the lengthwise-extending apertures 1838 to receive a fastening bolt.

The reinforcement portion provides added strength to the connector 30 which is required to meet the working pressure specified in SAE standard J518. The invention is described hereinafter with reference to the embodiment disclosed in FIGS. 4, 5 and 6.

The base has a port face mounting surface 32a at one end. The port face mounting surface 32a has an annular recess 42 formed therein which is designed to receive an "O" ring which seals the connector 30 on a desired port face 24.

The connector 30 has a generally-cylindrical connection piece 36 fixed to and extending from the narrow or tapered end of the conical extension 32b. The connection piece 36 is designed to interconnect with a variety of elements such as a tube extension, hose, or pipe. The length L2 of the connection piece 36 can be varied depending on the intended element to which the connector is attached. The connection piece 36 may have a threaded outer or other surface for releasable interconnection with the desired tube, pipe, hose or the like. Alternatively, the connection piece is permanently fastened to a tube, pipe, hose, or the like by, for example, brazing, welding or swaging.

A central, elongate cylindrical channel extends lengthwise through the connector 30. As shown in FIG. 5, the central channel has a uniform diameter D1 along its length. However, the diameter of the channel may be varied along its length if desired. The channel has ports 40 at the port face mounting surface 32a and the end of the connection piece 36.

The connector 30 has a plurality of tabs 34 fixed to and extending outwardly from the base portion 32. In the embodiment illustrated in FIGS. 4–6, the connector has two tabs 34 diametrically opposed from one another. Each tab 34 has a lengthwise-extending aperture 38 extending therethrough. Each aperture 38 is designed to align with a threaded bore 22 in the port face surrounding the fluid-flow port 6. Referring to FIG. 6, the tabs have a flat surface or spot face 34a on which the heads of fastening bolts are torqued. The conical extension 32b has semi-circular cut-outs 32c in the area proximate the apertures 38 to provide clearance for the fastening bolt heads.

The dimensions of the connector 30 are described below in Tables IA and IB. The dimensions of the connector 30 are selected such that the tab apertures 38 align with the threaded bores 22 in the port face 24 and such that the central port 40 aligns with the fluid-flow port 6. Thus, the dimensions of the connector 30 are dictated in part by the port dimensions specified in SAE standard J518. However, the width W (2×R1) of the connector 30 has been reduced in accordance with the present invention to be equal to or smaller than the minimum pad width EE specified in SAE standard J518.

TABLE IA (English)
TWO-BOLT CONNECTOR SPECIFICATIONS

| Nominal Flange Size | Foot Print Dimensions | | | | | Bolt Size | Maximum Working Pressure |
|---|---|---|---|---|---|---|---|
| D1 (in.) | Z (in.) | R1 (in.) | R2 (in.) | T (in.) | D2 (in.) | U.S. | (p.s.i.) |
| 1/8 | .750 | .296 | .156 | .250 | .180 | #8-32NC | 12,000 |
| 1/4 | .875 | .359 | .188 | .312 | .205 | #10-24NC | 10,000 |
| 3/8 | 1.125 | .422 | .203 | .375 | .281 | 1/4-20NC | 8,500 |
| 1/2 | 1.650 | .640 | .297 | .500 | .343 | 5/16-18NC | 5,000 |
| 3/4 | 2.070 | .797 | .325 | .563 | .406 | 3/8-16NC | 5,000 |
| 1 | 2.305 | .922 | .406 | .625 | .406 | 3/8-16NC | 5,000 |
| 1-1/4 | 2.600 | 1.046 | .375 | .625 | .469 | 7/16-14NC | 4,000 |
| 1-1/2 | 3.088 | 1.235 | .437 | .625 | .531 | 1/2-13NC | 3,000 |
| 2 | 3.496 | 1.484 | .437 | .625 | .531 | 1/2-13NC | 3,000 |

TABLE IB (Metric)
TWO-BOLT CONNECTOR SPECIFICATIONS

| Nominal Flange Size | Foot Print Dimensions | | | | | Bolt Size | Maximum Working Pressure |
|---|---|---|---|---|---|---|---|
| D1 (mm) | Z (mm) | R1 (mm) | R2 (mm) | T (mm) | D2 (mm) | Metric | (p.s.i.) |
| 3.2 | 19 | 7.5 | 4 | 6.4 | 4.5 | M4-.7 | 12,000 |
| 6.4 | 22.2 | 9.1 | 4.8 | 7.9 | 5.6 | M5-.8 | 10,000 |
| 9.5 | 28.6 | 10.7 | 5.2 | 9.5 | 6.8 | M6-1 | 8,500 |
| 12.7 | 41.9 | 16.3 | 7.5 | 12.7 | 8.75 | M8-1.25 | 5,000 |
| 19 | 52.6 | 20.2 | 8.3 | 14.3 | 10.5 | M10-1.5 | 5,000 |
| 25 | 58.5 | 23.4 | 10.3 | 15.9 | 10.5 | M10-1.5 | 5,000 |
| 31.7 | 66 | 26.6 | 9.5 | 15.9 | 12.5 | M12-1.75 | 4,000 |
| 38 | 78.4 | 31.4 | 11.1 | 15.9 | 14.5 | M14-2 | 3,000 |
| 50.8 | 88.8 | 37.7 | 11.1 | 15.9 | 14.5 | M14-2 | 3,000 |

For example, the minimum pad width EE for a 1/2 inch flange connector according to SAE standard J518 is 1.31 inches. The width W of applicant's 1/2" connector 30 is 1.28 inches (2×0.640 inches (R1)).

Figure 7:
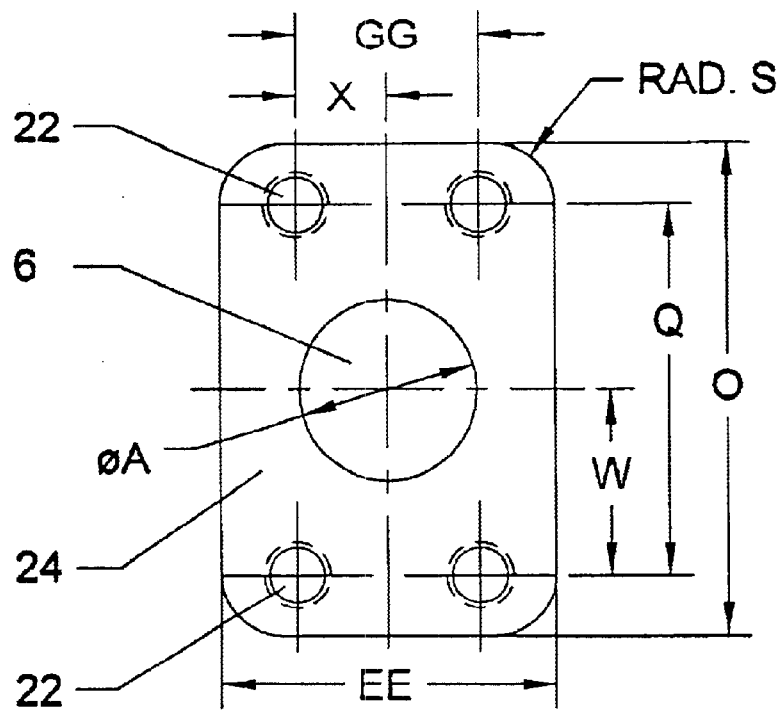
FIG. 7 is a schematic illustration of the minimum four-bolt flange port dimensions set forth in SAE standard J518.
Figure 8:
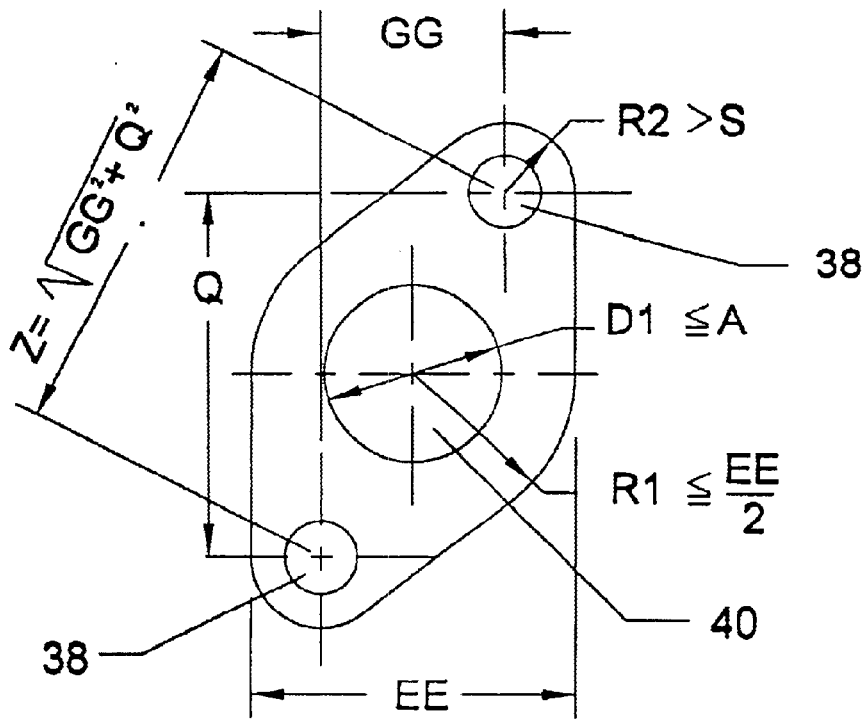
FIG. 8 is a footprint including reference dimensions of the connector illustrated in FIG. 4.
Figure 9:
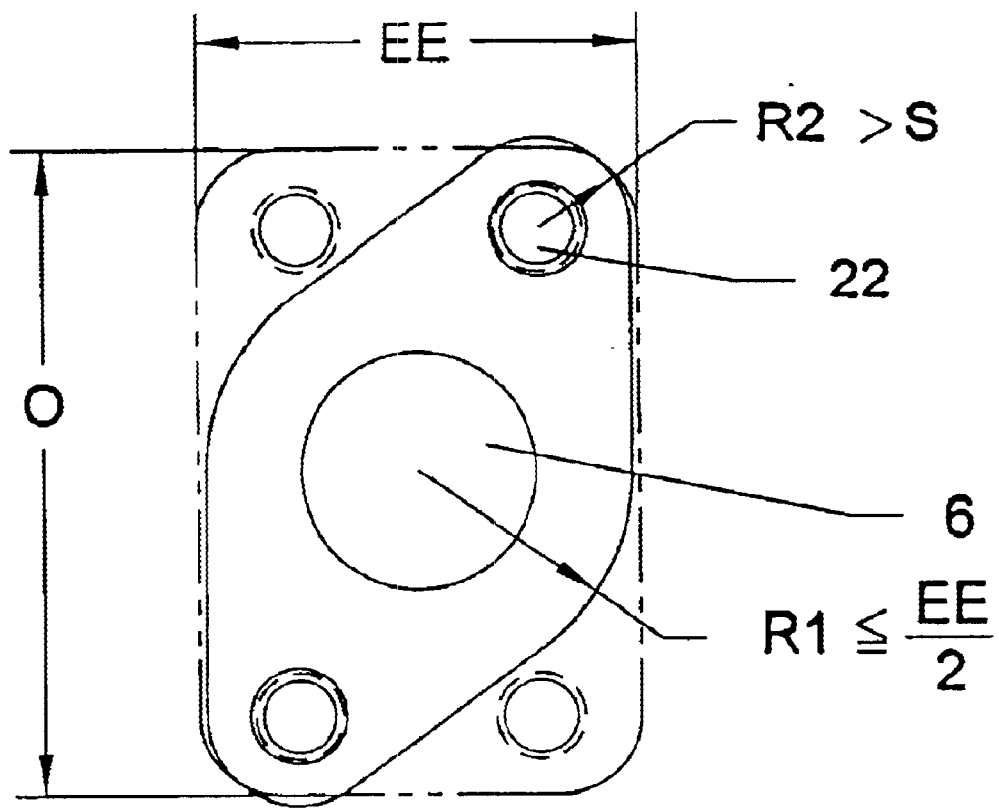
FIG. 9 is a schematic illustration of a footprint of the connector of FIG. 4 superimposed on the minimum four-bolt flange port dimensions of FIG. 7.

The four-bolt flange minimum pad size of SAE standard J518 is illustrated in FIG. 7 wherein the various dimensions are identified by reference letters. For comparison, the dimensions (footprint) of the connector 30 are illustrated in FIG. 8 relative to the corresponding SAE standard J518 reference letter. Referring to FIG. 9, the footprint of FIG. 8 is shown superimposed on the pad of FIG. 7. FIG. 9 illustrates how the connector 30 fits within the minimum pad width EE set forth in SAE standard J518 and properly aligns with the threaded bores 22 and fluid-flow port 6.

Referring to FIG. 9, it can be seen that the radius R2 projects slightly above the port pad dimension O. This projection, however, is not great enough to cause any interference when the connectors are nested (described below) and mounted on ports that meet the minimum dimension BB of SAE standard J518.

Figure 10:
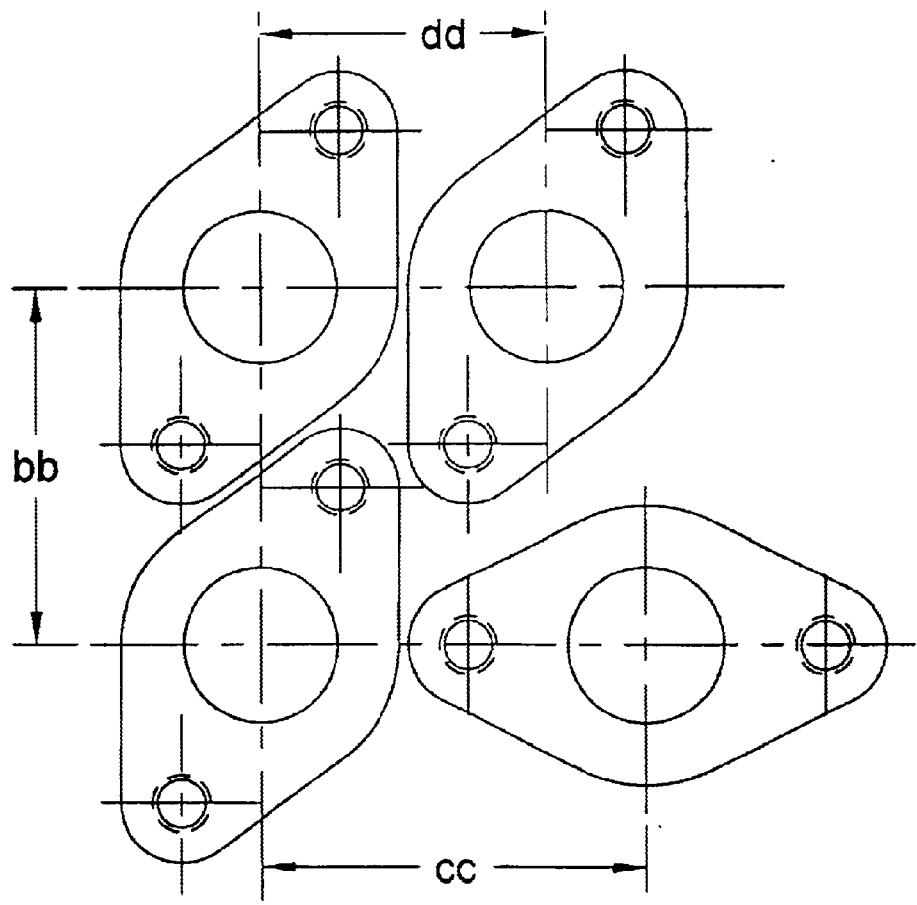
FIG. 10 is a schematic illustration of nested footprints including referenced dimensions of the connector illustrated in FIG. 4.

Because the width W of the connector 30 is reduced, and because of its unique geometry, the minimum spacing between adjacent fluid-flow ports 6 can be reduced compared to the prior art dimensions BB, CC, and DD. FIG. 10 illustrates how the connectors 30 can be nested to reduce the minimum port dimensions bb, cc, and dd between two-bolt flange connectors 30 of the present invention. A comparison of the minimum port dimensions BB, CC and DD of SAE standard J518 and the reduced port dimensions bb, cc and dd of the two-bolt flange connector of the present invention is shown in Table II.

TABLE II

SAE Standard J518 Recommended Port Dimensions BB, CC, DD vs. Reduced Port Dimensions bb, cc, dd of Two-Bolt Invention

| Nominal Size (in.) | BB vs bb (in.) | | CC vs cc (in.) | | DD vs dd (in.) | |
|---|---|---|---|---|---|---|
| 1/8 | XXX | 0.906 | XXX | 0.844 | xxx | 0.625 |
| 1/4 | XXX | 1.031 | XXX | 1.000 | XXX | 0.750 |
| 3/8 | XXX | 1.218 | XXX | 1.203 | XXX | 0.875 |
| 1/2 | 2.22 | 1.765 | 2.06 | 1.843 | 1.91 | 1.312 |
| 3/4 | 2.66 | 2.093 | 2.41 | 2.343 | 2.16 | 1.625 |
| 1 | 2.84 | 2.343 | 2.62 | 2.531 | 2.41 | 1.875 |
| 1 1/4 | 3.22 | 2.531 | 3.09 | 2.796 | 2.97 | 2.125 |
| 1 1/2 | 3.78 | 2.984 | 3.56 | 3.296 | 3.34 | 2.500 |
| 2 | 4.09 | 3.328 | 4.00 | 3.734 | 3.91 | 3.000 |

XXX-no SAE specified dimension.

It can be readily seen that the connector 30 of the present invention enables one of ordinary skill in the art to design a fluid-flow system having a more compact design compared to the prior art since the fluid-flow ports 6 can be arranged much closer than the comparable ports for a four-bolt, split-flange connector as taught in SAE standard J518. One knowledgeable in the art will easily recognize the advantages of this reduced size.

Figure 11:
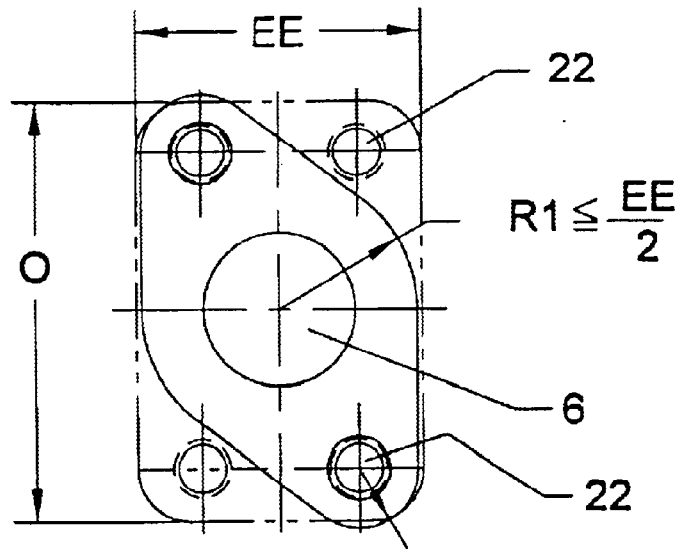
FIG. 11 is a schematic illustration of a footprint of the connector of FIG. 4 superimposed on the minimum four-bolt flange port dimensions of FIG. 7 rotated about the fluid-flow port central axis.

Referring to FIG. 11, it can be seen that the two-bolt flange connector 30 of the present invention can be rotated around the fluid-flow port 6 central axis to avoid tapped holes from intercepting with fluid flow passages as well as to avoid two-bolt flange installment interference.

The two-bolt flange 30 of the present invention provides not only reduced port dimensions bb, cc, and dd compared to the dimensions specified in SAE standard J518, but also satisfies the strength requirements specified in SAE standard J518. Table I also shows that the maximum working pressure for the two-bolt connector 30 of the present invention meets or exceeds the maximum working pressure specified in Code 61 of SAE standard J518. For example, the maximum working pressure for the 1/2 inch, 3/4 inch, and 1 inch, connectors of the present invention is 5,000 p.s.i. The maximum working pressure for the 1/8 inch, 1/4 inch, and 3/8 inch connectors is even higher. Thus, many sizes of the two-bolt connector 30 of the present invention meet or exceed not only the working pressure specified in Code 61 (standard pressure series) but also Code 62 (high pressure series) specified in SAE standard J518 for four-bolt connectors.

Further, the connector 30 meets or exceeds the working pressure specified in Code 61 with only a two-bolt design versus the four-bolt design specified in SAE standard J518. One knowledgeable in the art will easily recognize the advantages of a two-bolt design which include easier installation and manufacture.

As described above, the flange 30 is preferably made of a high strength structural material so that the flange 30 meets or exceeds the working pressure rating specified in SAE standard J518. However, it should be appreciated that the flange 30 can also be used in low pressure systems requiring a compact design. In such applications, the flange can be made of a low strength material such as plastic.

A further embodiment of the flanged connector of the present invention is illustrated with reference to FIGS. 12–15 which show a four-bolt flanged connector designated generally by reference numeral 130.

The four-bolt, flanged connector 130 has a one-piece construction in contrast with the prior art two-piece, split-flange connector 8 illustrated in FIGS. 1–3. Similar to the two-bolt, flanged connector 30 described above, the connector 130 is preferably manufactured from a high-strength structural material such as steel, iron, aluminum, or composite preferably medium carbon steel.

Figure 12:
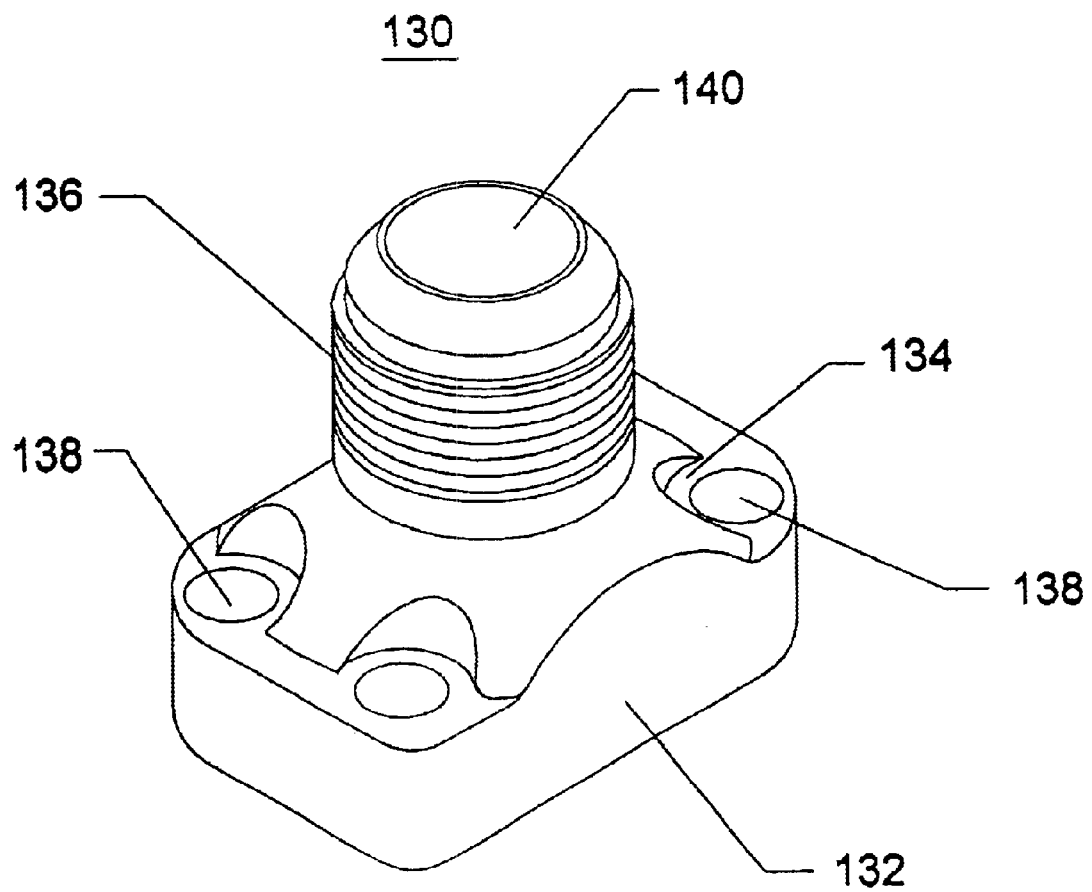
FIG. 12 is a perspective view of a four-bolt connector in accordance with an embodiment of the invention.
Figure 14:
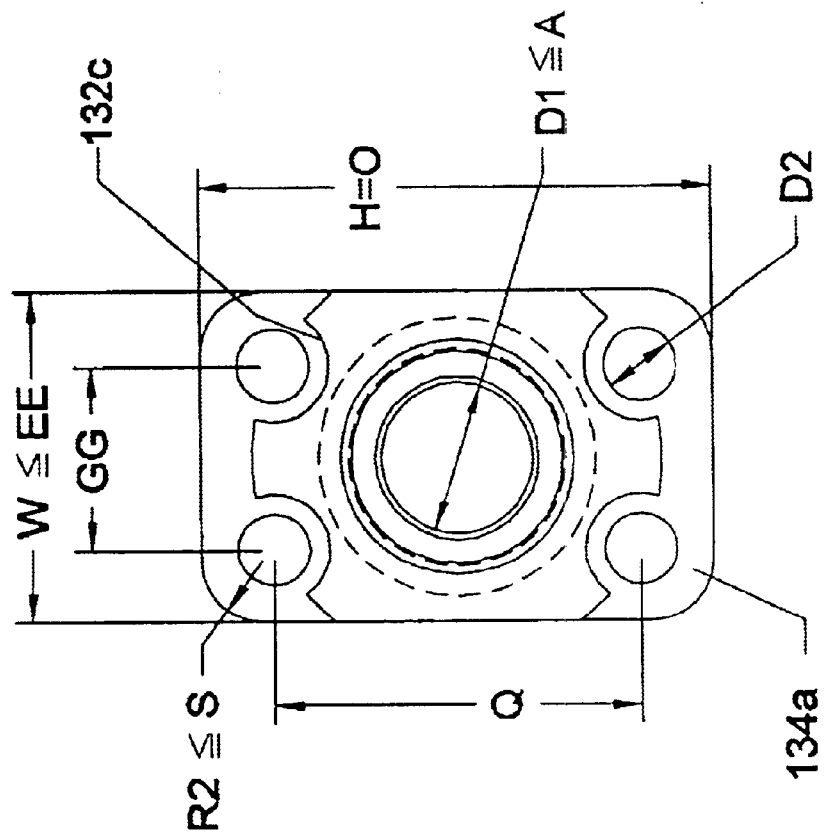
FIG. 14 is a front elevational view of the connector illustrated in FIG. 12 including reference dimensions.
Figure 13:
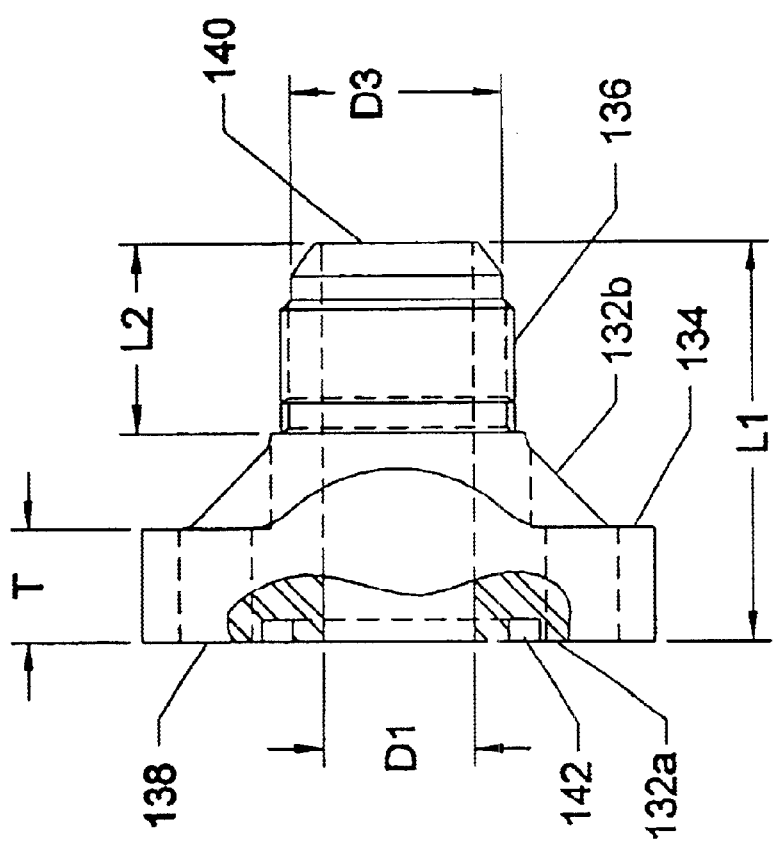
FIG. 13 is a side elevation with a partial fragmentary view of the connector illustrated in FIG. 12.

Referring to FIGS. 12–14, the connector 130 has a rectangular base portion 132, a reinforcement portion, and a generally-cylindrical connection piece 136. The base portion 132 has a height H and width W as best seen in FIGS. 13 and 14. The tabs (described below) have a thickness T. The connection piece 136 has a length L2 and outer diameter D3. The connector has an overall length L1.

The base portion 132 has a lengthwise-extending, generally conical extension 132b at one end and a generally-flat, port face mounting surface 132a at the other end. The port face mounting surface 132a has an annular recess 142 which is designed to receive an "O"-ring which seals the connector 130 on a desired port face 24. In the embodiment shown in FIGS. 12–14, the reinforcement portion is a generally-conical extension 132b which provides added strength to the connector 130 which is required to meet the working pressure specified in SAE standard J518. Similar to the two-bolt design described above, the reinforcement portion may alternatively have the ribbed design or increased thickness design shown in FIGS. 5a, 6a, 5b, 6b, respectively.

The connector 130 has a generally-cylindrical connection piece 136 fixed to and extending from the narrow or tapered end of the conical extension 132b. The connection piece 136 is designed to interconnect with a variety of elements such as a tube extension, hose, or pipe. The length L2 of the connection piece 136 can be varied depending on the intended element to which the connector is attached. The connection piece 136 may have a threaded or other outer surface for releasable interconnection with the desired tube, pipe, hose or the like. Alternatively, the connection piece 136 may be permanently fixed to a tube, pipe, hose or the like by, for example, brazing, welding or swaging.

A central, elongate cylindrical channel extends lengthwise through the connector 130. As shown in FIG. 13, the central channel has a uniform diameter D1 along its length. However, the diameter of the channel may be varied along its length if desired. The channel has ports 140 on the port face mounting surface 132a and the end of the connection piece 136.

The connector 130 has four tabs 134 fixed to and extending outwardly from the base portion 132. In the embodiment illustrated in FIGS. 12–14, the connector has a pair of tabs on opposed height-wise ends of the base. Each tab has a lengthwise-extending aperture 138 extending therethrough. Each aperture 138 is designed to align with a threaded bore 22 in the port face 24 surrounding the fluid-flow port 6. Referring to FIG. 14, the tabs have a flat surface or spot face 134a on which the heads of fastening bolts are torqued. The conical extension 132b has semi-circular cut-outs 132c in the area proximate the apertures 138 to provide clearance for the fastening bolt heads.

The dimensions of the four-bolt connector are described below in Tables IIIA and IIIB. The dimensions of the connector 130 are selected such that the tab apertures 138 align with the threaded bores 22 in the port face 24 and such that the central port 140 aligns with the fluid-flow port 6. Thus, the dimensions of the connector 130 are dictated in part by the port dimensions specified in SAE standard J518. However, the width W of the connector 130 has been reduced in accordance with the present invention to be equal to or smaller than the minimum pad width EE specified in SAE standard J518.

TABLE IIIA (English)
Four-Bolt Connector Specifications

| Nominal Flange Size (in.) | Foot Print Dimensions | | | | | | Bolt | Maximum Working |
|---|---|---|---|---|---|---|---|---|
| D1 (in.) | Q (in.) | GG (in.) | W (in.) | R2 (in.) | T (in.) | D2 (in.) | Size U.S. | Pressure (p.s.i.) |
| 1/8 | 0.696 | 0.278 | 0.594 | 0.156 | 0.250 | 0.180 | #8-32NC | 12,000 psi |
| 1/4 | 0.804 | 0.344 | 0.719 | 0.187 | 0.312 | 0.205 | #10-24NC | 11,000 psi |
| 3/8 | 1.038 | 0.430 | 0.844 | 0.203 | 0.375 | 0.281 | 1/4-20NC | 8,500 psi |
| 1/2 | 1.500 | 0.688 | 1.281 | 0.297 | 0.500 | 0.343 | 5/16-18NC | 6,000 psi |
| 3/4 | 1.875 | 0.875 | 1.594 | 0.325 | 0.562 | 0.406 | 3/8-16NC | 6,000 psi |
| 1 | 2.062 | 1.031 | 1.844 | 0.406 | 0.625 | 0.406 | 3/8-16NC | 6,000 psi |
| 1-1/4 | 2.312 | 1.188 | 2.093 | 0.375 | 0.625 | 0.469 | 7/16-14NC | 6,000 psi |
| 1-1/2 | 2.750 | 1.406 | 2.469 | 0.437 | 0.625 | 0.531 | 1/2-13NC | 6,000 psi |
| 2 | 3.062 | 1.688 | 2.969 | 0.437 | 0.625 | 0.531 | 1/2-13NC | 6,000 psi |

TABLE IIIA (Metric)
Four-Bolt Connector Specifications

| Nominal Flange Size (in.) | Foot Print Dimensions | | | | | | Bolt | Maximum Working |
|---|---|---|---|---|---|---|---|---|
| D1 (mm) | Q (mm) | GG (mm) | W (mm) | R2 (mm) | T (mm) | D2 (mm) | Size Metric | Pressure (p.s.i.) |
| 1/8 | 17.68 | 7.06 | 15 | 3.2 | 6.4 | 4.5 | M4-7 | 12,000 psi |
| 1/4 | 20.42 | 8.73 | 18.2 | 4.8 | 7.9 | 5.6 | M5-8 | 11,000 psi |
| 3/8 | 26.36 | 10.92 | 21.4 | 5.2 | 9.5 | 6.8 | M6-1 | 8,500 psi |
| 1/2 | 38.1 | 17.47 | 32.5 | 7.5 | 12.7 | 8.75 | M8-1.25 | 6,000 psi |
| 3/4 | 47.63 | 22.22 | 40.5 | 8.3 | 14.3 | 10.5 | M10-1.5 | 6,000 psi |
| 1 | 52.37 | 26.19 | 46.8 | 10.3 | 15.9 | 10.5 | M10-1.5 | 6,000 psi |
| 1-1/4 | 58.73 | 30.18 | 53.1 | 9.5 | 15.9 | 12.5 | M12-1.75 | 6,000 psi |
| 1-1/2 | 69.85 | 35.71 | 62.7 | 11.1 | 15.9 | 14.5 | M14-2 | 6,000 psi |
| 2 | 77.77 | 42.87 | 75.4 | 11.1 | 15.9 | 14.5 | M14-2 | 6,000 psi |

For example, the minimum pad width EE for a ½ inch flange connector according to SAE standard J518 is 1.31 inches. The width W of applicant's ½ inch connector 130 is 1.281 inches.

The four-bolt flange minimum pad size of SAE standard J518 is illustrated in FIG. 7 wherein the dimensions are identified by reference letters. For comparison, the dimensions of the connector 130 are illustrated in FIG. 14 relative to the corresponding SAE standard J518 reference letter. FIG. 14 shows that the connector 130 will fit within the minimum pad width EE set forth in SAE standard J518 and will properly align with the threaded bores 22 and fluid-flow port 6.

Figure 15:
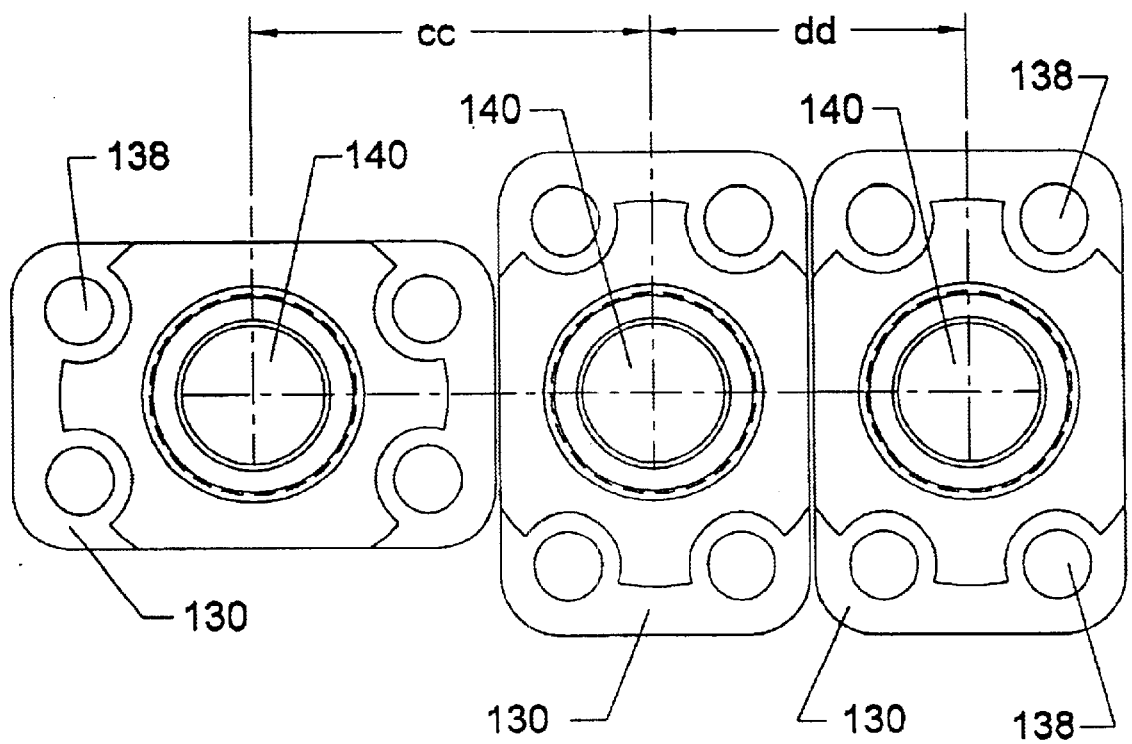
FIG. 15 is a schematic illustration of nested footprints of the four-bolt connector illustrated in FIG. 12 including referenced dimensions.

Because the width W of the connector 130 is reduced, the minimum spacing between adjacent fluid-flow ports 6 can be reduced compared to the prior art dimensions CC and DD of SAE standard J518. FIG. 15 illustrates how the connectors 130 can be nested to reduce the minimum port dimensions cc and dd between four-bolt flange connectors 130 of the present invention. A comparison of the minimum port dimensions CC and DD of SAE standard J518 and the reduced port dimensions cc and dd of the four-bolt flange connector 130 of the present invention is shown in Table IV.

TABLE IV

SAE Standard J518 Recommended Port Dimensions vs. Reduced Port Dimensions of Four-Bolt Invention

| Nominal Size (in.) | CC vs. cc (in.) | | DD vs. dd (in.) | |
|---|---|---|---|---|
| 1/8 | XXX | 0.875 | XXX | 0.625 |
| 1/4 | XXX | 1.031 | XXX | 0.750 |
| 3/8 | XXX | 1.234 | XXX | 0.875 |
| 1/2 | 2.062 | 1.718 | 1.906 | 1.312 |
| 3/4 | 2.406 | 2.094 | 2.156 | 1.625 |
| 1 | 2.625 | 2.312 | 2.406 | 1.875 |
| 1-1/4 | 3.093 | 2.625 | 2.968 | 2.125 |
| 1-1/2 | 3.562 | 3.094 | 3.344 | 2.500 |
| 2 | 4.000 | 3.500 | 3.906 | 3.00 |

XXX - no SAE specified dimension

Since the connector 130 of the present invention has a more compact design compared to the prior art, the fluid flow ports 6 can be arranged much closer than the comparable ports for a four-bolt split flange connector as taught in SAE standard J518. One knowledgeable in the art will easily recognize the advantages of this reduced size.

The four-bolt flange connector 130 of the present invention provides not only reduced port dimensions cc and dd compared to the dimensions specified in SAE standard J518, but also satisfies the strength requirements specified in SAE standard J518. Table III shows that the maximum working pressure for the four-bolt connector 130 of the present invention meets or exceeds the maximum working pressure specified in both Code 61 and Code 62 of SAE standard J518. For example, the maximum working pressure for the ½ inch, ¾ inch, 1 inch, 1-¼ inch, 1½ inch, and 2 inch connectors is 6,000 p.s.i. The maximum working pressure for the ⅛ inch, ¼ inch, and ⅜ inch connectors 130 is 12,000, 11,000, and 8,5000 p.s.i. respectively. Thus, the four-bolt connector 130 of the present invention meets or exceeds not only the standard pressure series Code 61 but also the high pressure series Code 62 specified in SAE standard J518 for four-bolt connectors.

Tables I–IV list several embodiments of the connectors of the present invention. The embodiments listed in tables I–IV correspond to a range of port diameters common in the industry. However, the connectors of the present invention are not limited to the sizes recited therein. One of ordinary skill in the art will readily recognize that the connectors 30 and 130 can be made in each of the sizes specified in SAE standard J518 and achieve each of the above-described objects of the invention.

Figure 16:
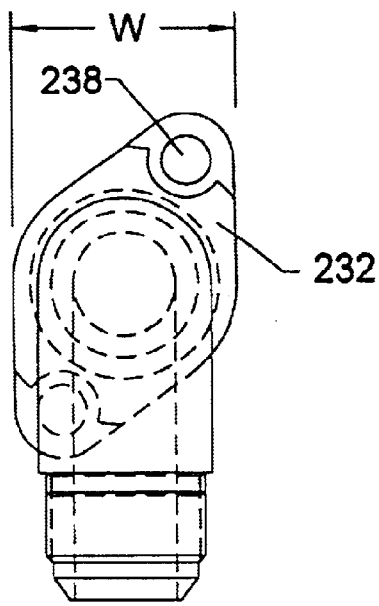
FIG. 16 is a front elevational view of a offset 90-degree, flanged connector in accordance with an embodiment of the invention.
Figure 17:
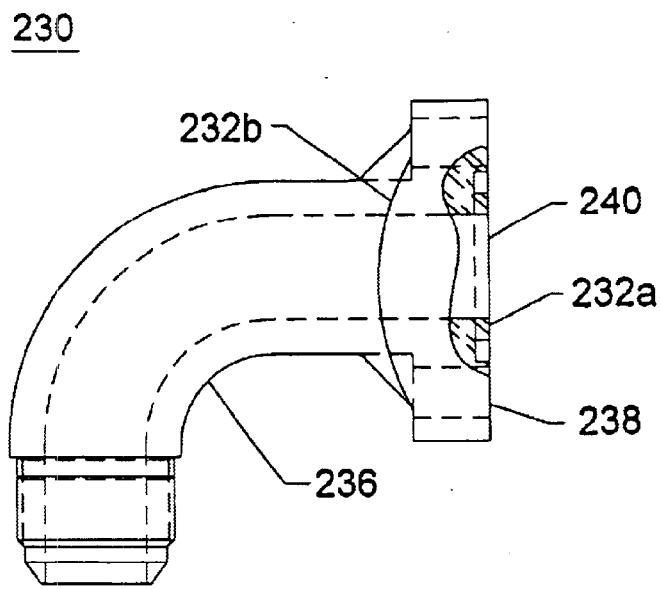
FIG. 17 is a side elevational view of the connector shown in FIG. 16.
Figure 18:
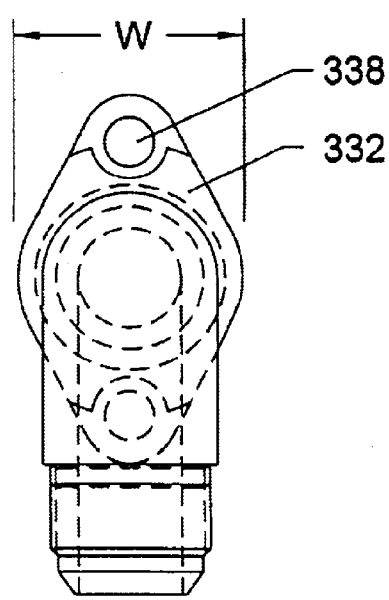
FIG. 18 is a front elevational view of an in-line 90-degree flanged connector in accordance with an embodiment of the invention.
Figure 19:
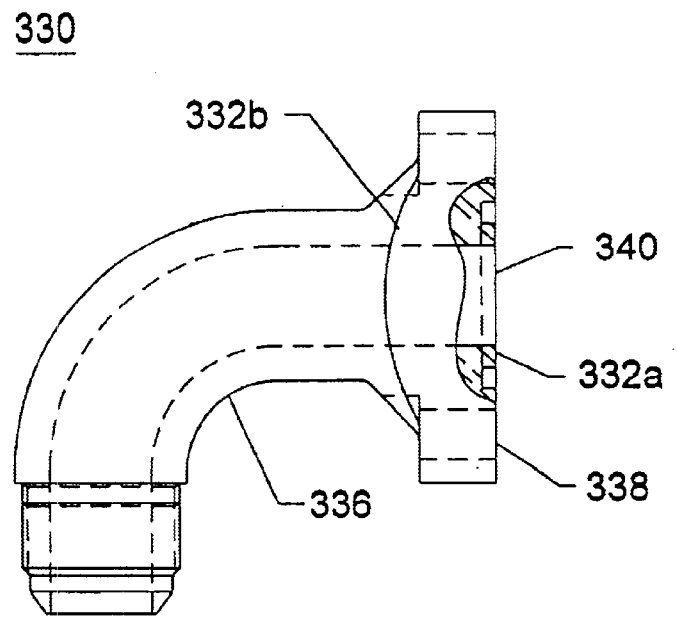
FIG. 19 is a side elevational view of the connector shown in FIG. 18.

FIGS. 16–17 illustrate an offset 90-degree, flanged connector 230. FIGS. 18–19 illustrate an in-line 90-degree flanged connector 330. Similar to the two-bolt connector 30 described above, both 90-degree flanged connectors 230/330 have a one-piece design. (A slash/is used herein to separate reference numerals designating respective similar elements of different embodiments.) The connectors 230/330 have an irregularly-shaped base portion 232/332 having a lengthwise extending, generally-conical extension (reinforcement portion) 232b/332b at one end and a generally-flat, port face mounting surface 232a/332a at the other end. The port face mounting surface 232a/332a has an annular recess 242/342 formed therein which is designed to receive an O-ring which seals the connector 230/330 on a desired port face 24.

The 90-degree flanged connectors 230/330 have a connection piece 236/336 fixed to and extending from the narrow or tapered end of the conical extension 232b/332b. The connection piece 236/336 is designed to interconnect with a variety of elements such as a tube extension, hose, or pipe.

In contrast with the connector 30 described above, the connection piece 236/336 of the connectors 230/330 bends 90-degrees to change the fluid flow direction without requiring additional fittings. The connectors 230/330 otherwise have the same construction and dimensions as the two-bolt connector 30 described above. Specifically, the dimensions of the 90-degree connectors 230/330 are selected such that the flange apertures 238/338 align with threaded bores 22 in the port face 24 and such that the central port 240/340 aligns with the fluid-flow port 6.

Additionally, the width W of the connectors 230/330 is reduced to be equal to or smaller than the minimum pad width EE specified in SAE standard J518. The connectors 230/330 also satisfy the strength requirements specified in SAE standard J518 with only a two-bolt design verses the four-bolt design specified in SAE standard J518.

Modular connectors in accordance with embodiments of the invention are illustrated in FIGS. 20–44. Unless otherwise indicated, the height H of each of the modular connectors shown in FIGS. 20–44 is preferably equal to the dimension O specified in SAE standard J518. Each of the modular connectors has a working pressure rating greater than or equal to the working pressure rating specified in SAE standard J518 corresponding to the nominal diameter D1 of the fluid-flow port.

Figure 20:
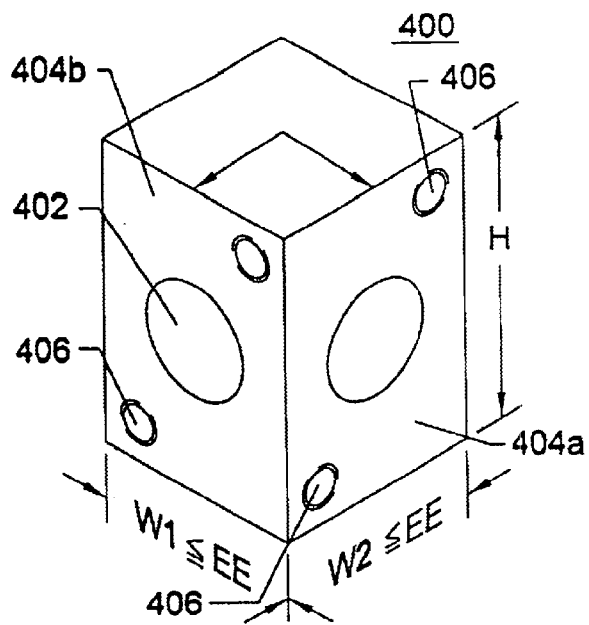
FIGS. 20, 21 and 22 are perspective views of integral Elbow, Tee and Cross modular connectors in accordance with embodiments of the invention.
Figure 21:
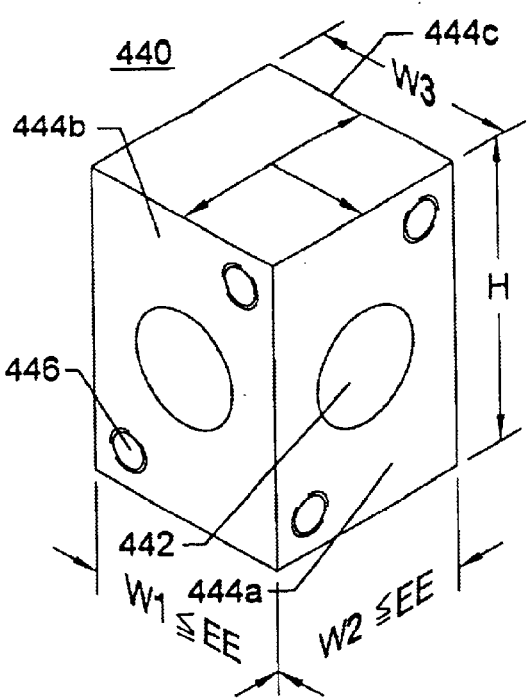
Figure 22:
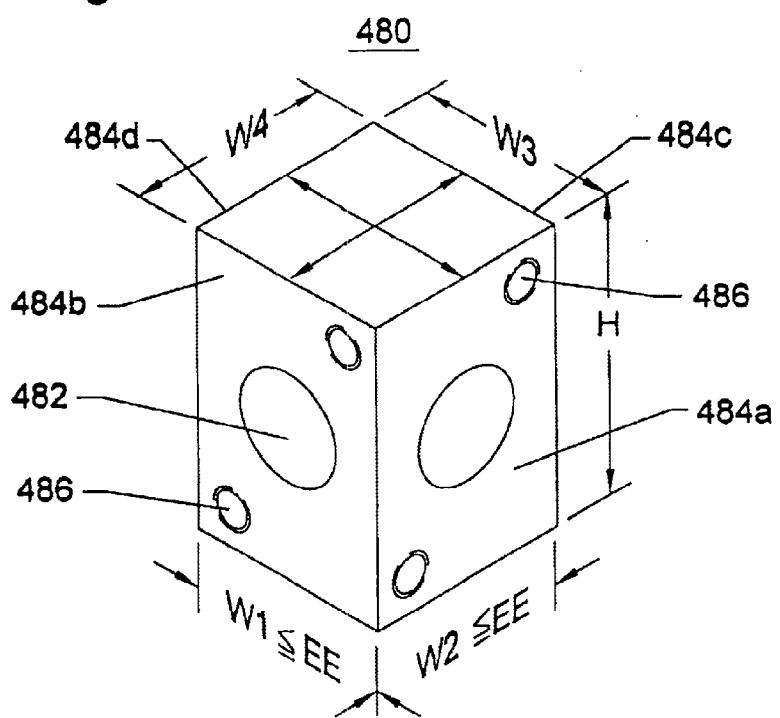

FIGS. 20–22 illustrate one-piece, block, fluid-flow connectors for connecting two or more two-bolt flanged connectors 30 (such as described above). The block connectors 400/440/480 have a plurality of mounting surfaces, each mounting surface having a width W and height H. A fluid flow channel extends from one mounting surface to each of the other mounting surfaces. The channel has ports 402/442/482 on each surface. The fluid-flow ports have a nominal diameter D1 at the mounting surfaces. A plurality of threaded bores 406/446/486 are located on each mounting surface for fastening a flanged connector to the mounting surface. In the embodiments illustrated in FIGS. 20–22, each connector has at least two mounting surfaces having a width W1, W2, each of which is less than FF, preferably less than or equal to the minimum pad width EE, specified in SAE standard J518 corresponding to the nominal port diameter D1.

FIG. 20 illustrates an Elbow modular connector 400 in accordance with an embodiment of the invention. The Elbow connector 400 has a single-piece, block construction with a central channel extending therethrough. The central channel extends inwardly from a first mounting surface 404a, bends 90-degrees, and exits through a second mounting surface 404b. The connector 400 has a pair of threaded bores 406 diagonally located on opposed sides of the channel ports 402.

FIGS. 21 and 22 illustrate modular Tee 440 and Cross 480 connectors, respectively, in accordance with an embodiment of the invention. The Tee 440 and Cross 480 connectors have a construction similar to the Elbow connector 400 but have additional mounting surfaces 444c/484c/484d and a differently shaped fluid-flow channel. The shape of the fluid-flow channel of each connector is illustrated graphically in FIGS. 20–31 by fluid-flow lines on the top of or above each connector.

The elbow connector 400 has two mounting surfaces having a width W1, W2. The Tee connector 400 has three mounting surfaces having a width W1, W2, W3. The Cross connector 480 has four mounting surfaces having a width W1, W2, W3, W4.

Flanged two-bolt connectors 30, such as described above, can be mounted on each mounting surface 404a,404b/444a, 444b,444c/484a,484b,484c,484d of the Elbow 400, Tee 440, and Cross 480 connectors, respectively, by inserting socket head bolts through the connector tabs 34 and into the threaded bores 406/446/486.

FIGS. 20–22 illustrate that the width of each mounting surface of the connectors 400/440/480 is less than the recommended pad width FF established in SAE standard J518. Preferably, the width of each mounting surface is equal to EE, the minimum pad width specified in SAE standard J518 corresponding to the nominal diameter D1 of the central port 402/442/482. The mounting surface width may be less than EE provided the width of the mating flange connector 30 is less than the width of the mounting surface, thereby maintaining a widthwise differential between the mounting surface and the flange connector.

Figure 22A:
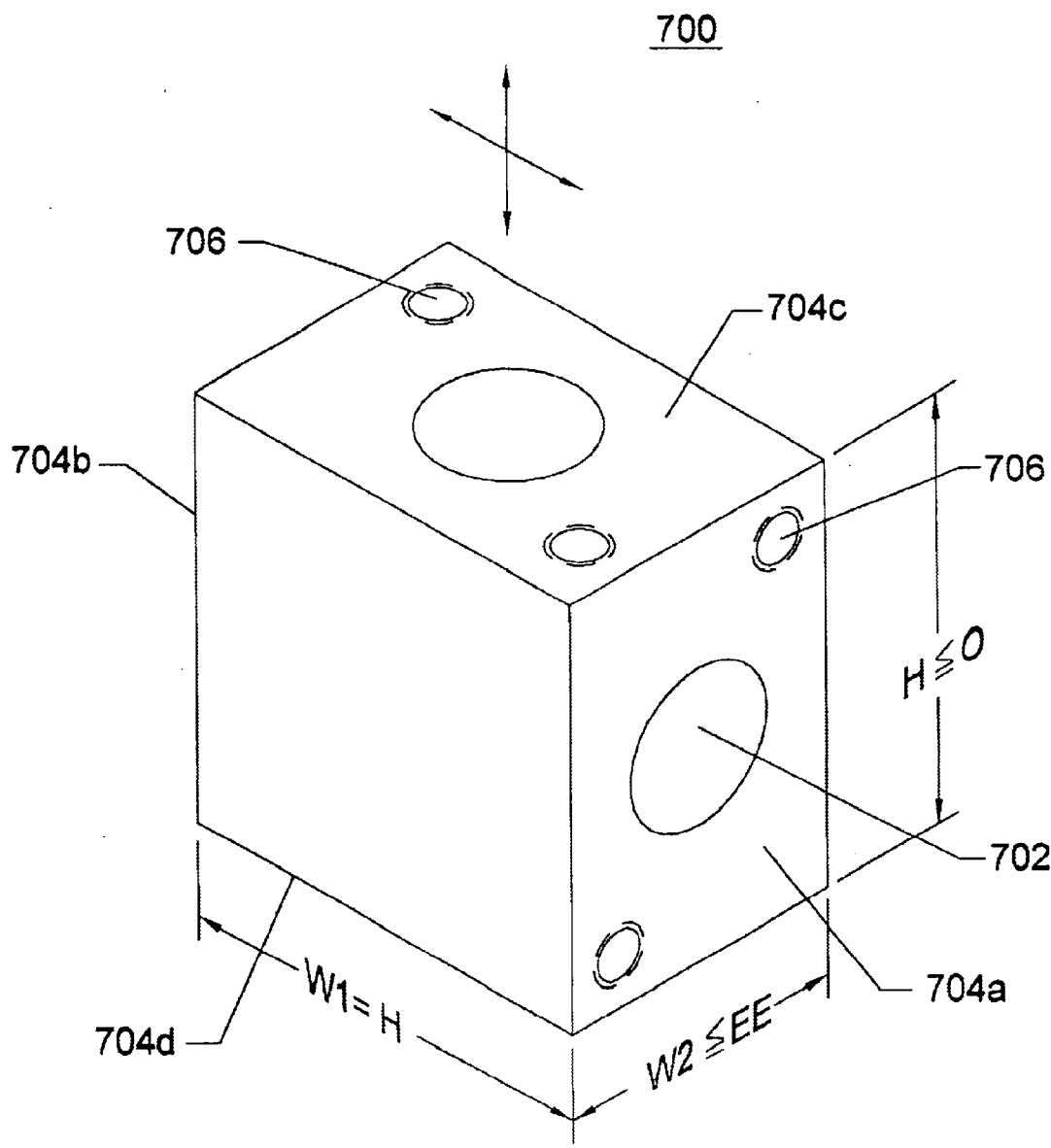
FIGS. 22a, 22b, and 22c are perspective views of four-port and six-port modular connectors in accordance with embodiments of the invention.
Figure 22B:
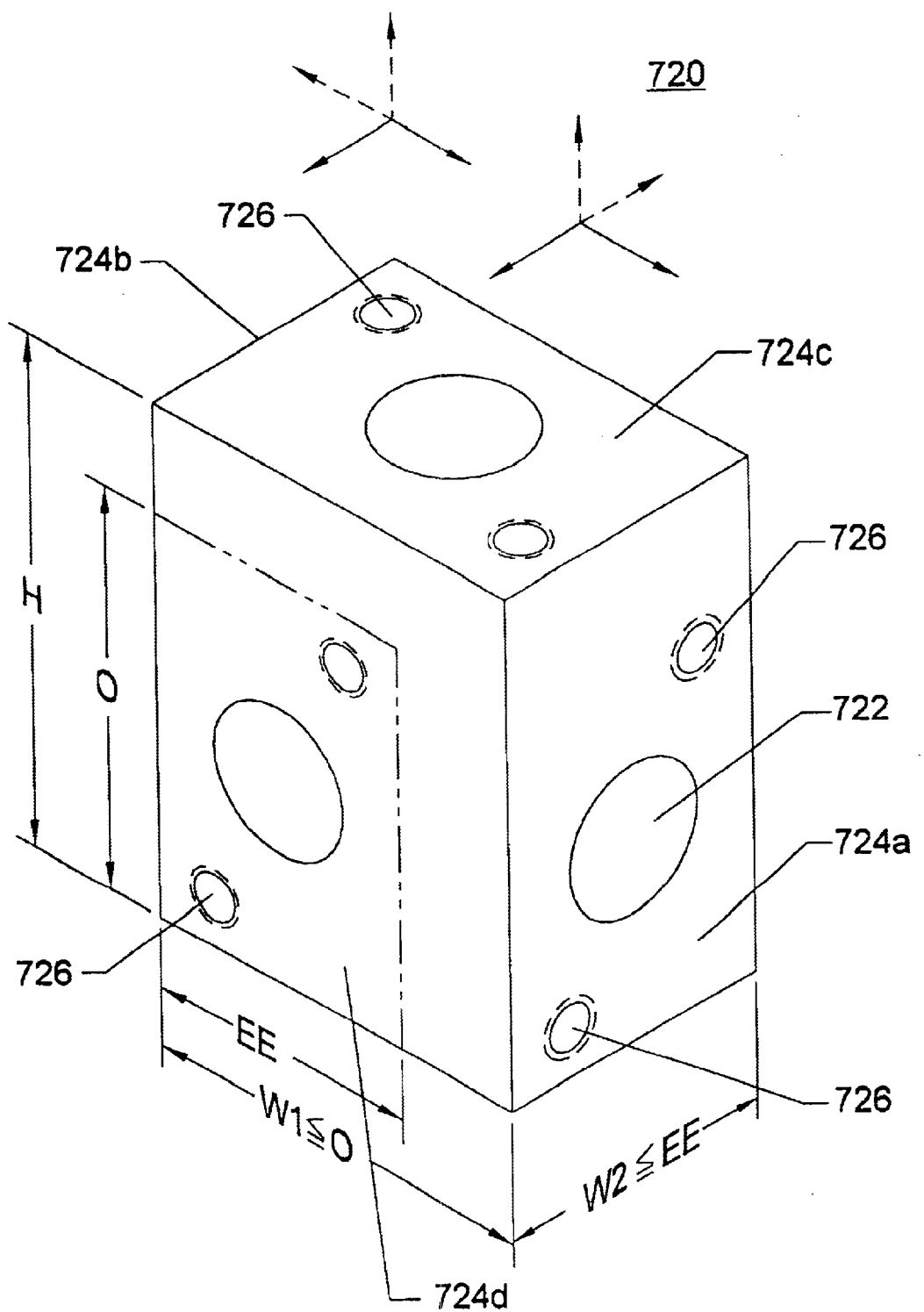
Figure 22C:
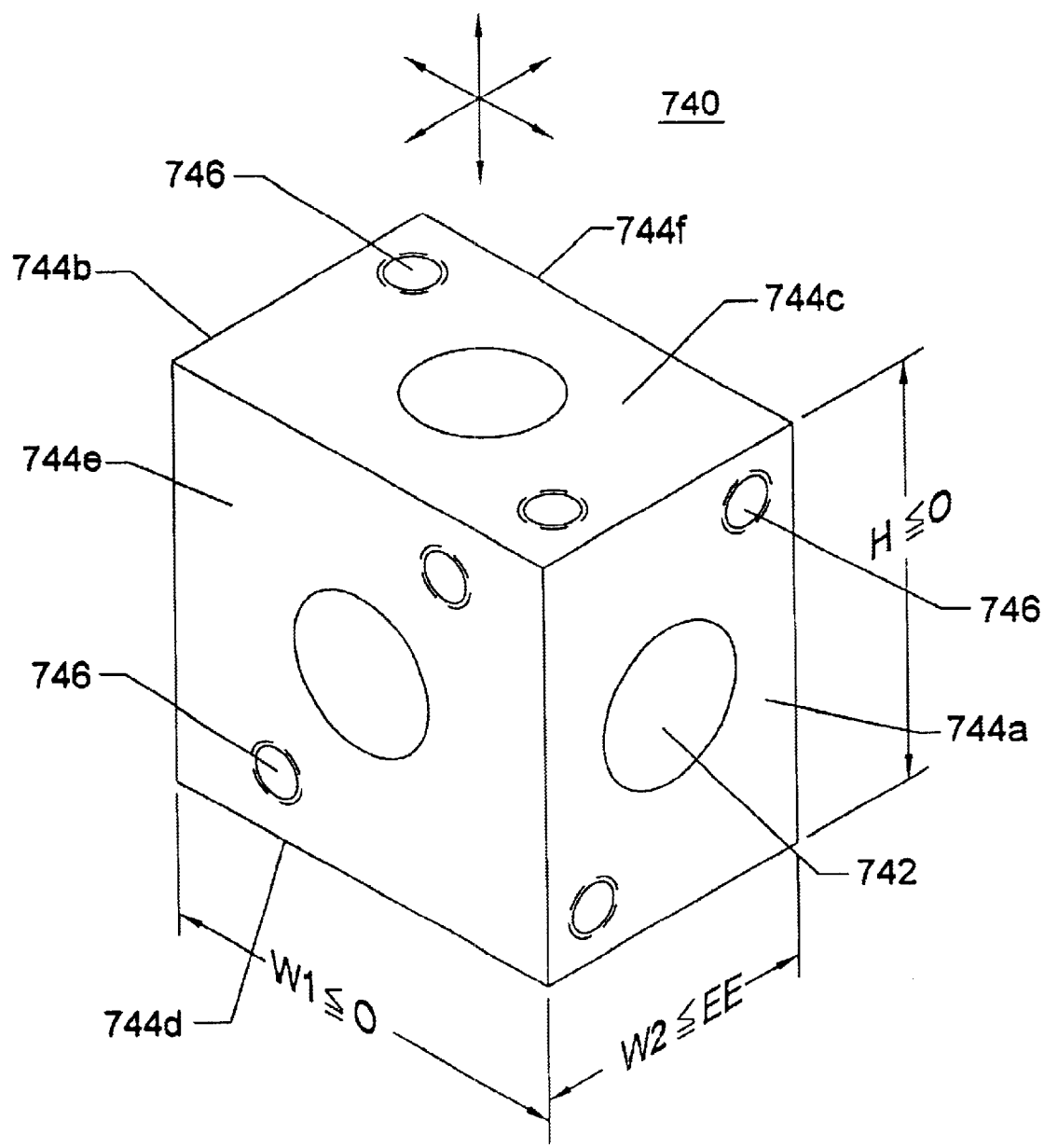

FIGS. 22a, 22b, and 22c illustrate further embodiments of the block, fluid-flow connectors for connecting two or more flanged connectors (such as described above). The block connectors 700/720/740 have a construction similar to the above-described connectors 400/440/480. However, the connectors 700/720/740 have a top mounting surface 704c/724c/744c and a bottom mounting surface 704d/724d/744d. FIGS. 22a and 22b show different embodiments of a four-port block connector while FIG. 22c shows a six-port block connector.

FIGS. 22a, 22b, and 22c show the dimensions of the connectors relative to the dimension EE. FIGS. 22a, 22b, and 22c show that the width W1 must be wider than EE.

Figure 22D:
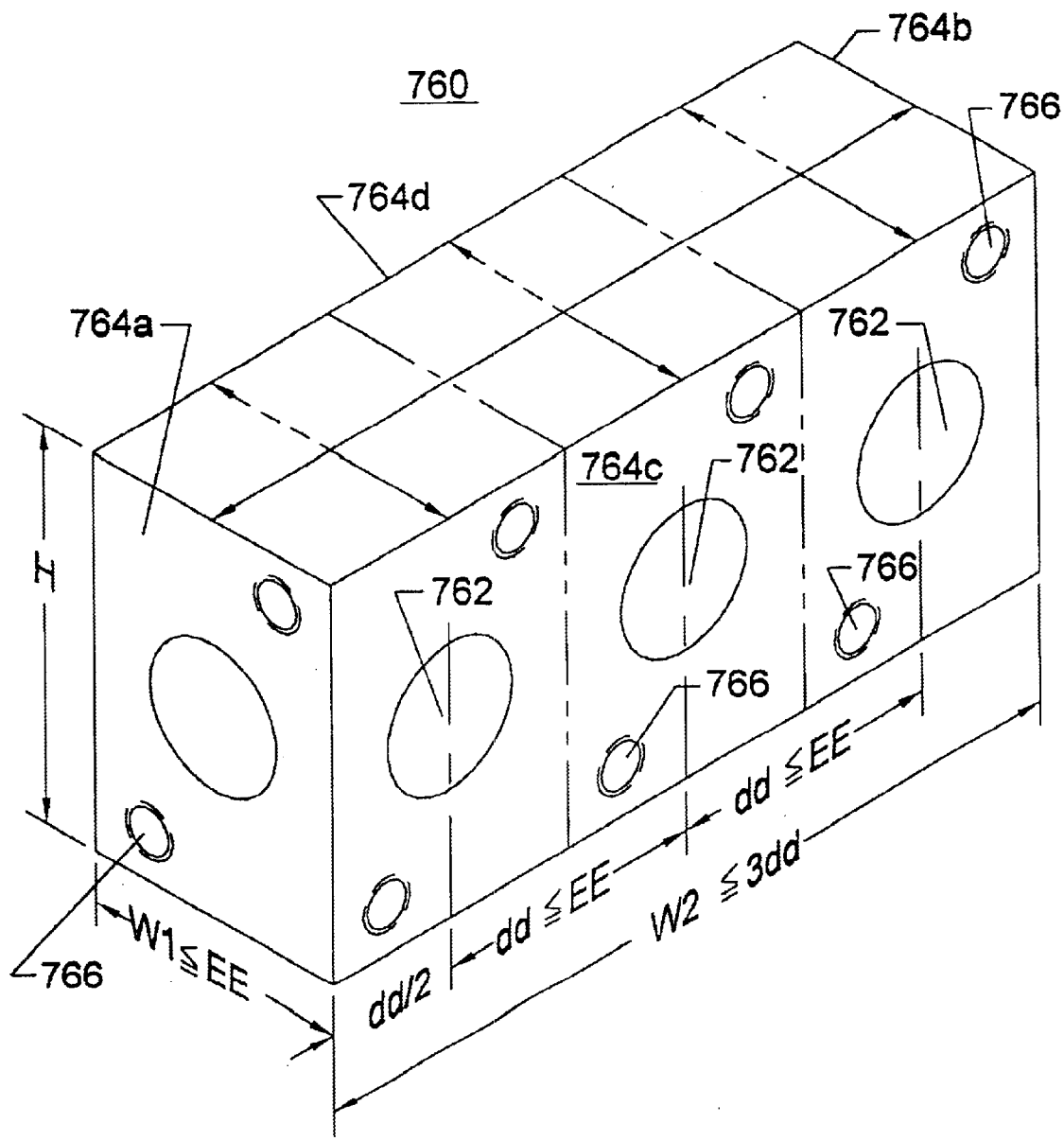
FIG. 22d is a perspective view of a header module in accordance with an embodiment of the invention.

FIG. 22d illustrates a further embodiment of the block, fluid-flow connector for connecting two or more flanged connectors 30 (such as described above). FIG. 22d illustrates a header module onto which multiple connectors may be fastened and interconnected by a common fluid-flow channel 762. The header module 760 illustrated in FIG. 22d has a plurality of mounting surfaces, each mounting surface having a width W and a height H. The fluid-flow channel extends from the first mounting surface 764a to each of the other mounting surfaces 764b-d. The channel has ports on two of the mounting surfaces 764a, 764b and multiple (n) ports on the other two mounting surfaces 764c, 764d. The fluid-flow ports have a nominal diameter D1 at the mounting surfaces. A plurality of threaded bores 766 are located on each mounting surface proximate each fluid-flow port 762.

In the embodiment illustrated in FIG. 22d, the header module 760 has two mounting surfaces 764a, 764b having a width W1 which is less than FF, and preferably less than or equal to the minimum pad width EE, specified in SAE standard J518 corresponding to the nominal port diameter D1. The other mounting surfaces 764c, 764d have a width W2 and a height H. The width W2 of the header module 760 is less than or equal to three times dd which the widthwise distance between the port centers. The dimension dd is less than FF, and preferably less than or equal to EE specified in SAE standard J518 corresponding to the nominal port diameter. The header module 760 may, however, be provided with a different number n of fluid-flow ports 762 on the multiple port mounting surfaces 764c, 764d. In that case, the width W2 of the header module 760 would be less than or equal to n times dd. The dimension dd may be less than EE provided that the width W of the flanged connector 30 attached thereto is less than the dimension dd.

Figure 22E:
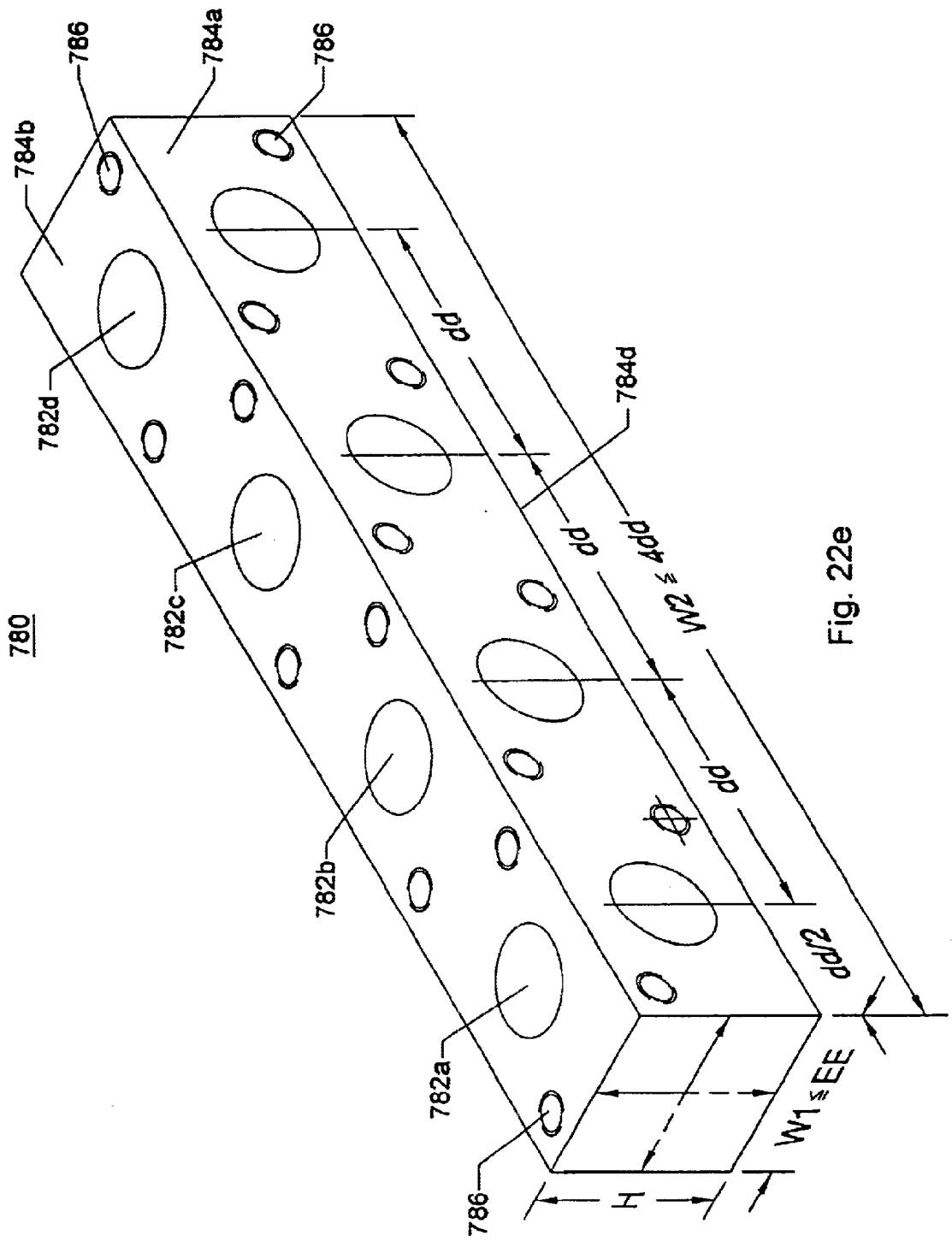
FIG. 22e is a perspective view of a junction module in accordance with an embodiment of the invention.

FIG. 22e illustrates a further embodiment of the block, fluid-flow connector for connecting two or more flanged connectors 30 (such as described above). FIG. 22e illustrates a junction module 780 to which multiple connectors can be attached to multiple, independent (unconnected) fluid-flow ports 782a–d. The junction module 780 has a plurality of mounting surfaces 784a–d. Independent fluid flow channels 782a–d extend from one mounting surface to each of the other mounting surfaces. The channels have ports on each of the mounting surfaces, respectively. The fluid-flow ports have a nominal diameter D1 at the mounting surfaces. A plurality of threaded bores 786 are located on each mounting surface proximate each fluid-flow port. In the embodiment illustrated in FIG. 22e, each mounting surface has a width W2 equal to four times dd. In this embodiment, the dimension dd is preferably equal to the dimension O specified in SAE standard J518 corresponding to the nominal port diameter D1. However, the width W1 and the height H are each less than FF, preferably less than or equal to the minimum pad width EE, specified in SAE standard J518.

Figure 23:
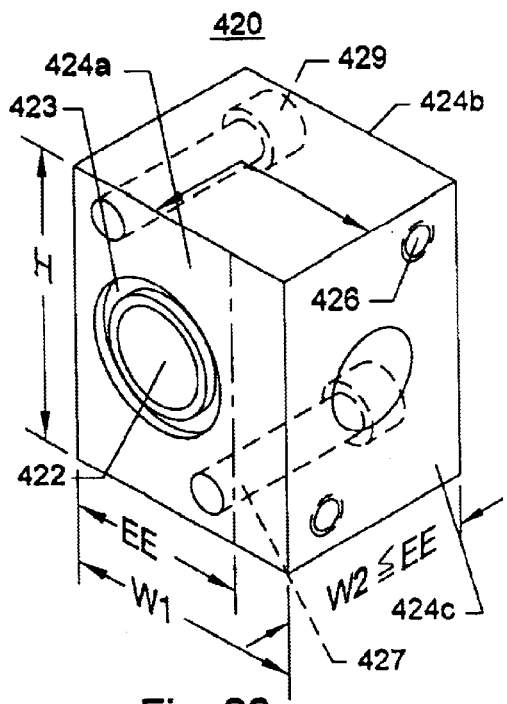
FIGS. 23, 24, 25 are perspective views of stackable Elbow, Tee and Cross modular connectors in accordance with an embodiment of the invention.
Figure 24:
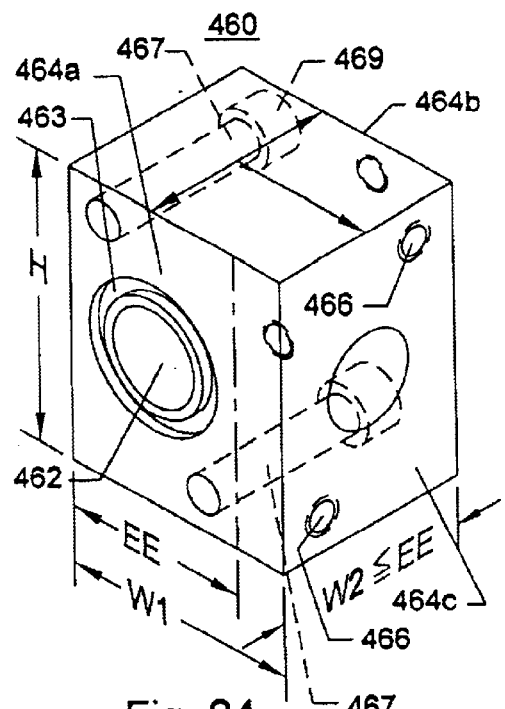
Figure 25:
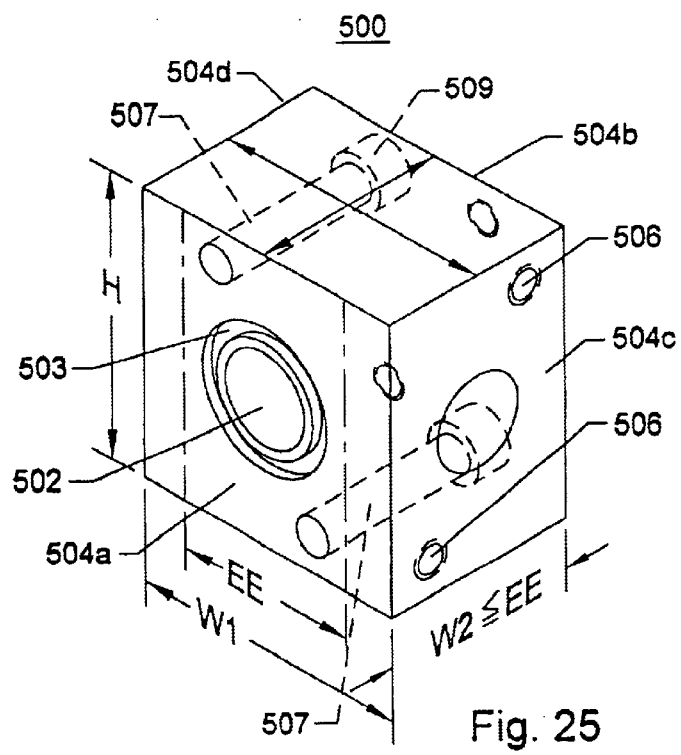

FIGS. 23–25 illustrate stackable, one-piece, Elbow 420, Tee 460 and Cross 500, fluid flow connectors for connecting one or more flanged connectors (such as described above) to a port face. The stackable block connectors 424c/464c/504c have at least one flange mounting surface, a port face mounting surface 424a/464a/504a, and a stacking surface 464b/504b opposite the port face mounting surface. An additional block connector can be fastened to or "stacked" on the stacking surface 464b/504b of the Tee and Cross connectors after the first block connector has been fastened to the port face. Each surface of the block connector has a width W and a height H. In the embodiments illustrated in FIGS. 23–25, the width W of the mounting surfaces is less than FF, preferably less than or equal to the minimum pad width EE, corresponding to the nominal port diameter D1.

A fluid-flow channel 422/462/502 extends from the port face mounting surface 424a/464a/504a to each of the mounting surfaces 424c/464c/504c, 504d. The fluid flow channel also extends to the stacking surface 464b/504b of the Cross and Tee connectors. The channel has ports on each surface. The fluid-flow ports have a nominal diameter D1 at the port face mounting surface and at each of the mounting surfaces.

A plurality of threaded fastening bores 426/466/506 are located on each mounting surface for fastening a flanged connector to the mounting surface. A plurality of threaded fastening bores 466/506 are also located on the stacking surface of the Cross and Tee connectors for fastening or stacking another block connector or the stacking surface.

In contrast with the connectors 400/440/480 described above, the connectors 420/460/500 have a designated port face mounting surface 424a/464a/504a having an annular recess 423/463/503 formed therein designed to receive an "O" ring which seals the block connector on a desired port face 24. The connector 420/460/500 has a pair of through bores 427/467/507 extending from the stacking surface to the port face mounting surface. The through bores are diagonally located on opposed sides of the central port. The bores 427/467/507 have a counterbore 429/469/509 on the stacking surface 424b/464b/504b. When fastening bolts are inserted through the bores 427/467/507, the bolt heads fit within the counterbores 429/469/509. A two-bolt flanged connector 30 or modular connector such as described above can then be fastened to or "stacked" on the stacking surface 464b/504b by inserting socket head bolts into the threaded bores 426/466/506. Two-bolt flanged connectors 30 can also be mounted on the mounting surfaces 464c/504c,504d of the Tee and Cross connectors, respectively, which also have threaded bores 466/506 diagonally located on opposed sides of the each port.

FIGS. 23–25 illustrate that the port face mounting surface in these embodiments is wider than the dimension EE. Otherwise, the threaded bores 426/466/506 and the through bores 427/467/507 would intersect and interfere with one another. However, the mounting surfaces 424c/464c/504c, 504d which are perpendicular to the port face mounting surface 424a/464a/504a have a width less than the recommended pad width FF established in SAE standard J518. Preferably, the width of the mounting surfaces 424c/464c/504c,504d is equal to EE, the minimum pad width specified in SAE standard J518 corresponding to the nominal diameter D1. The mounting surface width may be less than EE provided the width of the mating flange connector 30 is less than the width of the mounting surface, thereby maintaining a widthwise differential between the mounting surface and the flange connector.

Figure 25A:
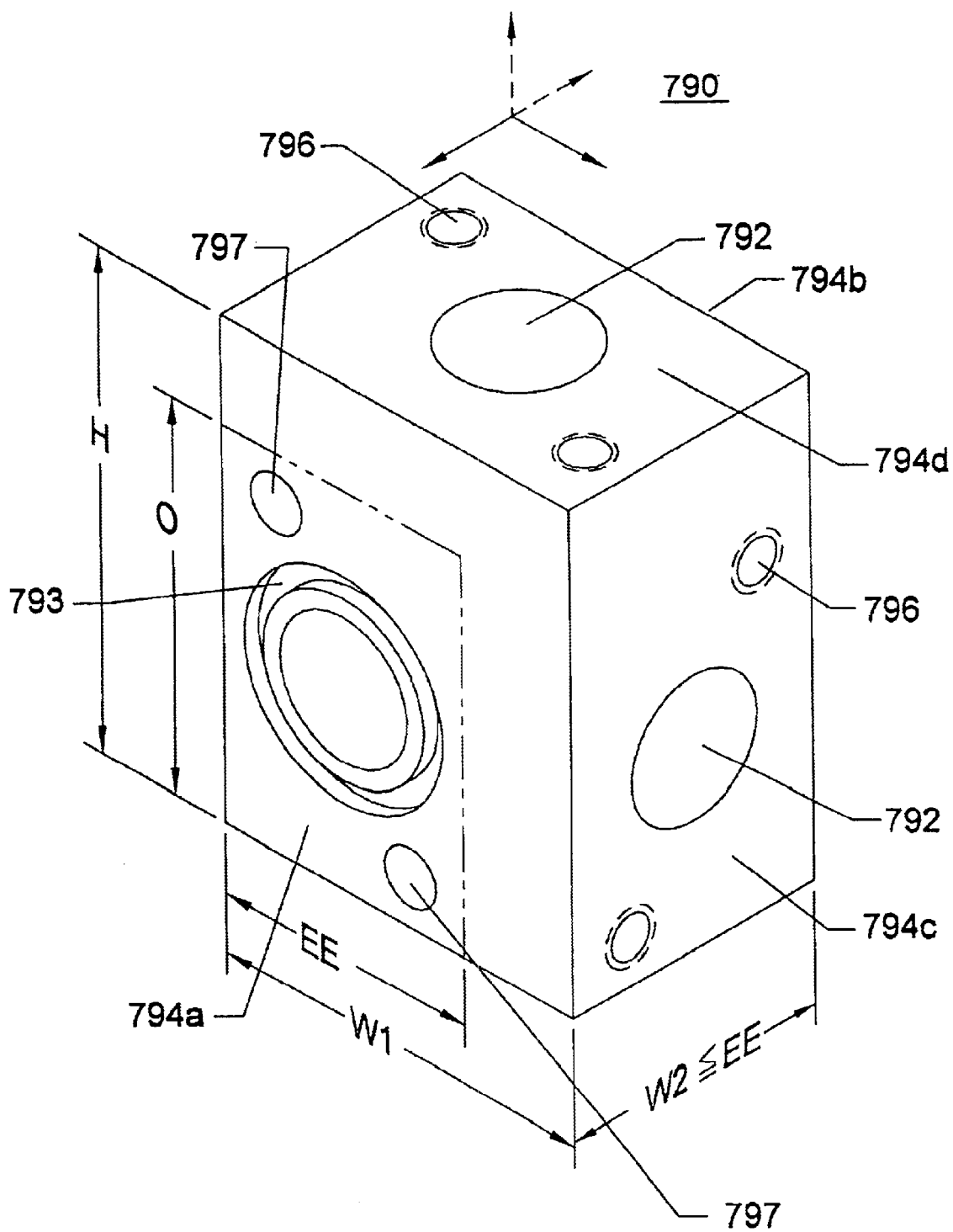
FIG. 25a is a perspective view of a four-port modular connector in accordance with an embodiment of the invention.

FIG. 25a illustrates a further embodiment of a stackable, fluid-flow connector for connecting one or more flanged connectors 30 (such as described above) to a port face. The block connector 790 has a construction similar to the above-described stackable connectors 420/460/500. However, the connector 790 has a top mounting surface 794d.

FIG. 25a shows the dimensions of the connector relative to the dimensions EE and O. FIG. 25a shows that the width of the port face mounting surfaces 794a and the stacking surface 794b must be wider than EE so that the threaded fastening bores 796 and the through bores 797 do not intersect and interfere with one another.

Figure 25B:
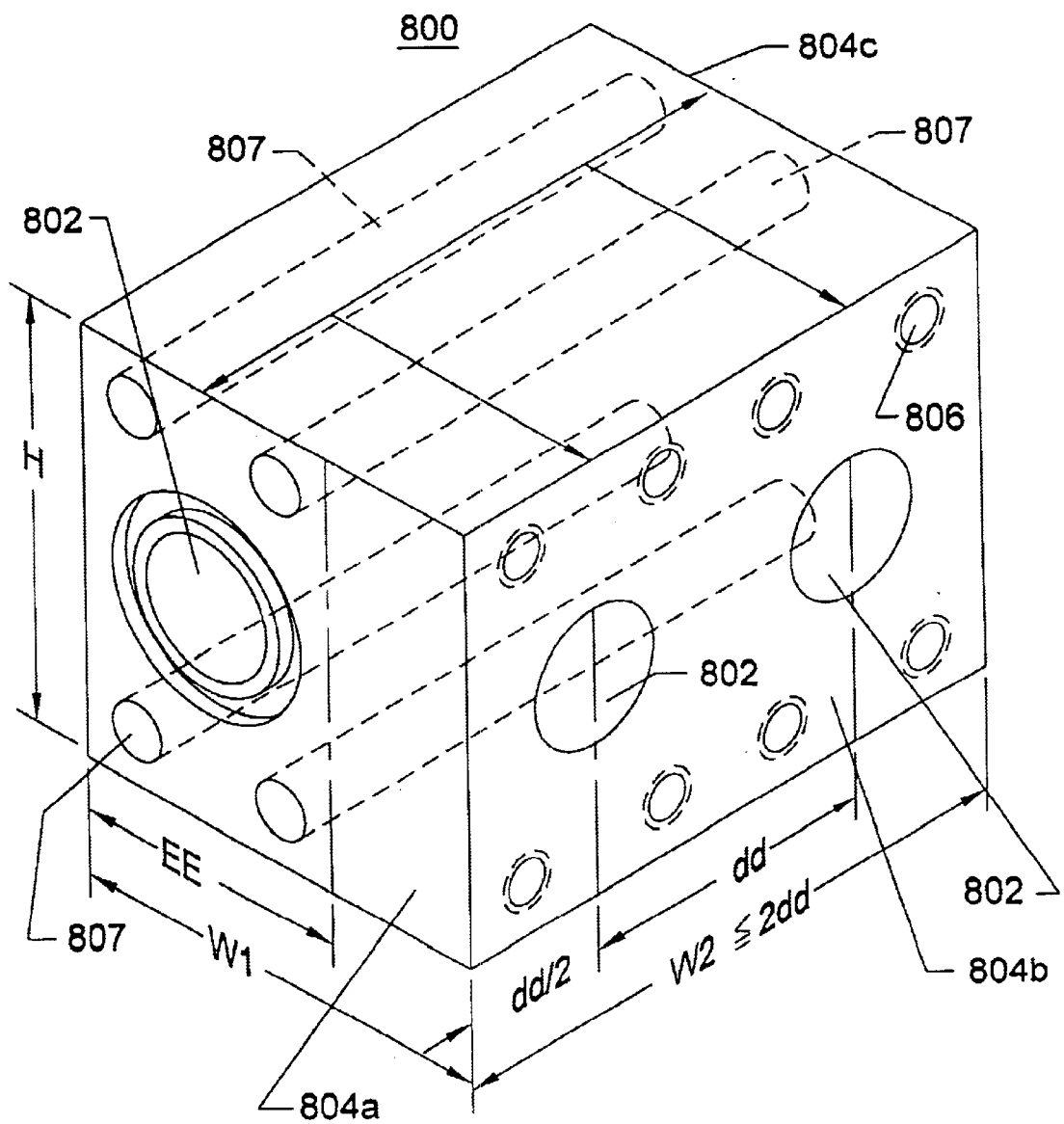
FIG. 25b is a perspective view of a stackable header module in accordance with an embodiment of the invention.

FIG. 25*b* illustrates a further embodiment of the block, fluid-flow connector for connecting two or more flanged connectors 130 (such as described above). FIG. 25*b* shows a "stackable" header module 800 on which multiple four-bolt connectors 130 can be fastened and interconnected with a common fluid-flow channel. The header module 800 has a port face mounting surface 804*a*, a stacking surface 804*c*, and a mounting surface 804*b*. An additional block connector can be fastened to or "stacked" on the stacking surface 804*c*. Each surface of the block has a width W and a height H.

A common fluid-flow channel 802 extends from the port face mounting surface 804*a* to the stacking surface 804*c* and multiple ports on the mounting surface 804*b*. The fluid-flow ports have a nominal diameter D1 at the port face mounting surface 804*a*, the mounting surface 804*b*, and the stacking surface 804*c*.

A plurality of threaded fastening bores 806 are located on each surface proximate each port. In the embodiment illustrated in FIG. 25*b*, the port face mounting surface has a width W1 which is greater than the dimension EE so that the threaded fastening bores 806 and the through bores 807 do not intersect and interfere with one another. The mounting surface 804*b* has a width W2 which is less than or equal to two times dd. In this embodiment, the dimension dd is less than FF, and preferably less than or equal to the dimension EE corresponding to the nominal diameter D1.

The two-bolt block connectors are illustrated and described above as "right-hand" connectors since the two threaded fastening bores, e.g. 406, 446, 726, are located in the upper right corner and lower left corner of each mounting surface. However, it should be appreciated that the connector 30 can be "left-handed" with fastening bores in the upper left and lower right corners.

Figure 26:
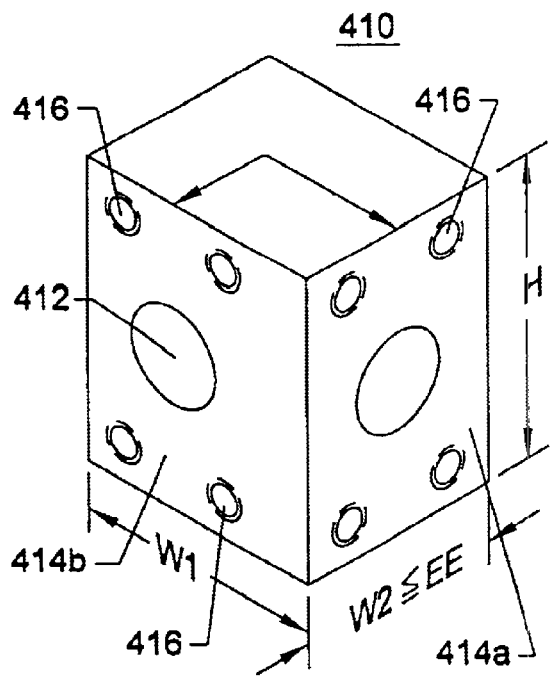
FIGS. 26, 27, 28 are perspective views of integral Elbow, Tee and Cross modular connectors in accordance with an embodiment of the invention.
Figure 27:
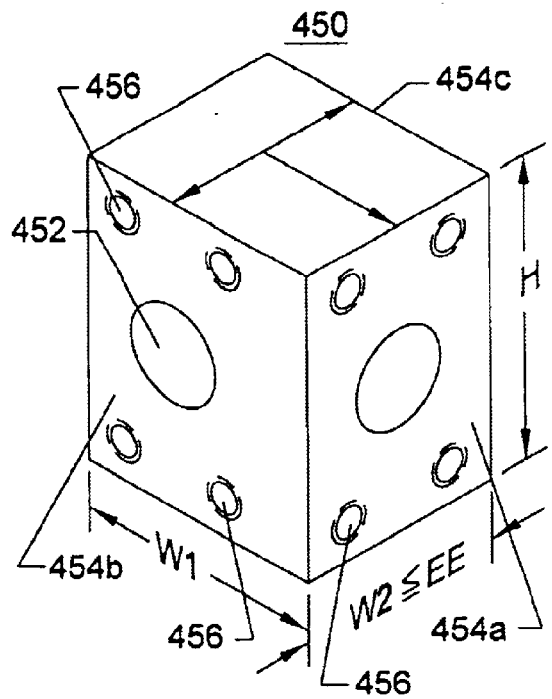
Figure 28:
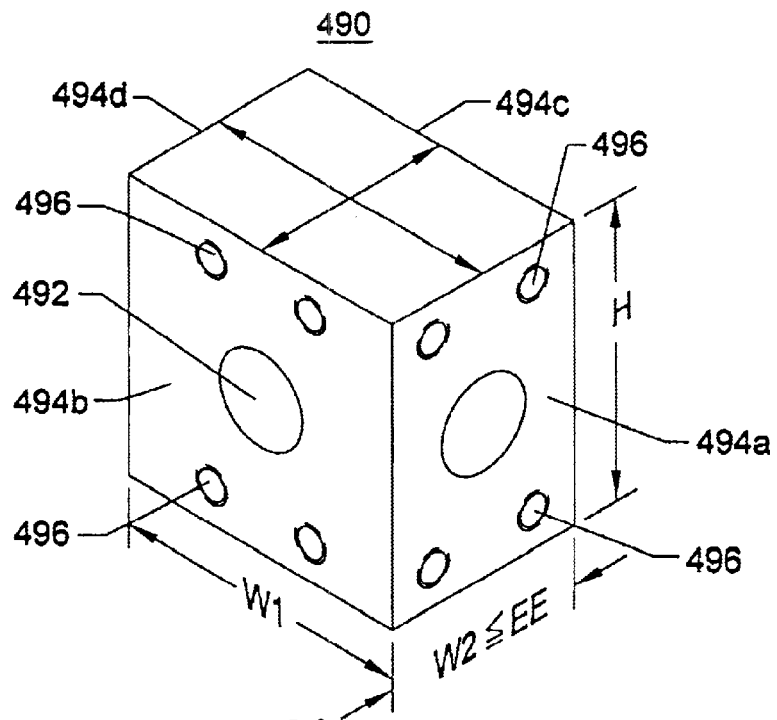

FIGS. 26–28 illustrate Elbow 410, Tee 450, and Cross 490 modular connectors designed to connect with the flanged four-bolt connectors 130 described above. The Elbow connector 410 has a single-piece, block construction with a central channel 412 extending therethrough. The central channel extends inwardly from a first mounting surface 414*a*, bends 90-degrees, and exits through a second mounting surface 414*b*. The channel has ports on each mounting surface. The connector 410 has two pair of threaded bores 416 diagonally located on opposed sides of the each port 412. The Tee 450 and Cross 490 connectors have a construction similar to the Elbow connector 410 but have additional mounting surfaces and a differently shaped fluid-flow channel. Flanged four-bolt connectors 130 can be mounted on the mounting surfaces 414*a*,414*b*/454*a*,454*b*, 454*c*/494*a*,494*b*,494*c*,494*d* of the Elbow 410, Tee 450, and Cross 490 connectors, respectively, by inserting socket head bolts through the connector tabs 134 and into the threaded bores 416, 456, 496.

FIGS. 26–28 illustrate that the width of at least one mounting surface 414*a*/454*a*/494*a*,494*d* is less than the recommended pad width FF established in SAE standard J518. Preferably, the width of the mounting surfaces 414*a*/ 454*a*/494*a*,494*d* is equal to EE, the minimum pad width specified in SAE standard J518 corresponding to the nominal diameter of the central port. The mounting surface width may be less than EE provided the width of the mating flanged connector 130 is less then the width of the mounting surface, thereby maintaining a widthwise differential between the mounting surface and the flange connector.

FIGS. 26–28 also illustrate that the other mounting surfaces 414*b*/454*b*,454*c*/494*d*,494*c* are wider than the dimension EE. Otherwise, the threaded bores 416/456/496 would intersect and interfere with one another. Therefore, additional widthwise material must be provided to prevent interference.

Figure 29:
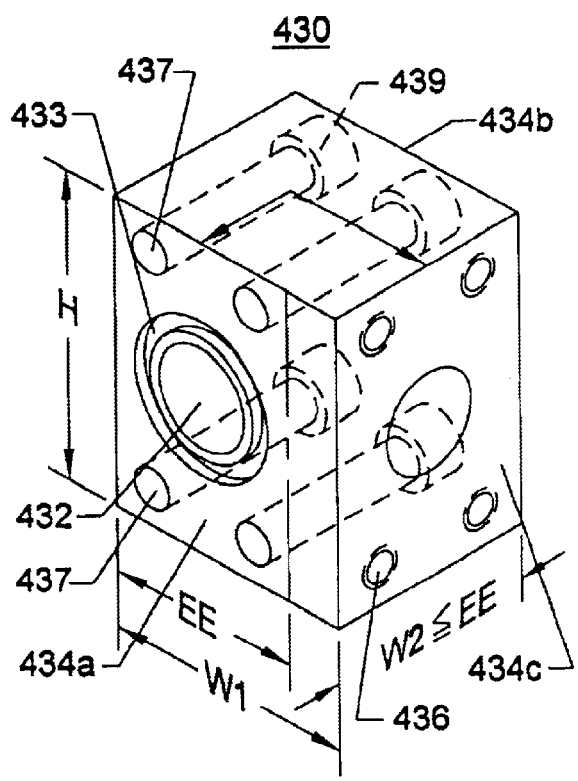
FIGS. 29, 30, 31 are perspective views of integral Elbow, Tee and Cross modular connectors in accordance with an embodiment of the invention.
Figure 30:
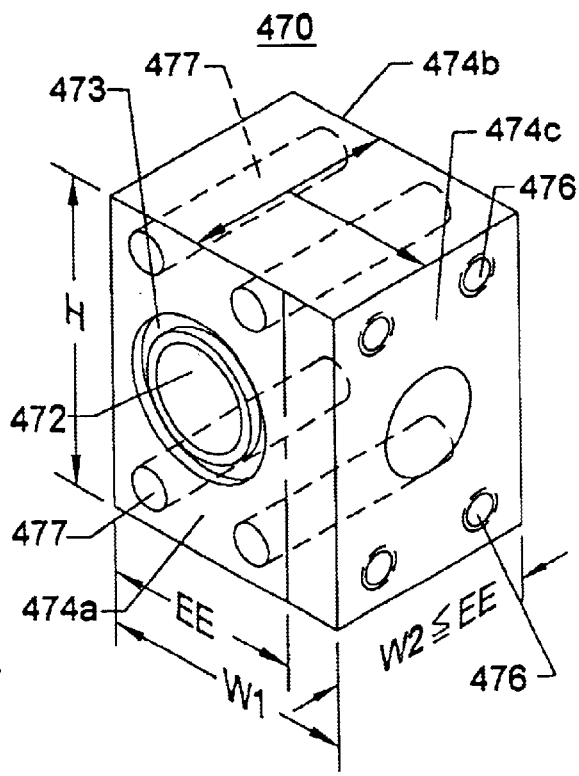
Figure 31:
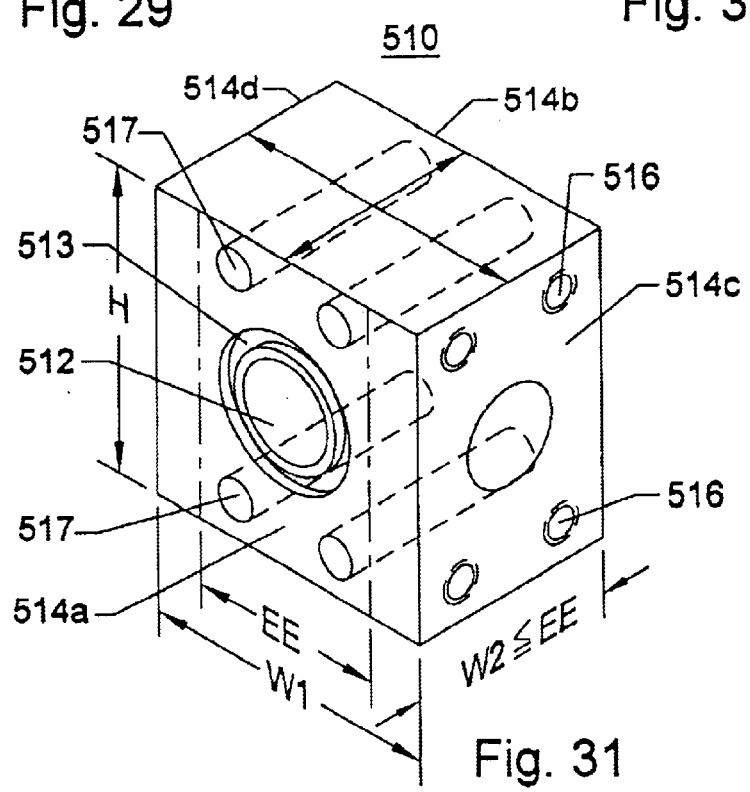

FIGS. 29–31 illustrate Elbow 430, Tee 470, and Cross 510 modular connectors which can be "stacked" and connected to one or more four-bolt connectors 130 described above. In contrast with the connectors 410/450/490 described above, the connectors 430/470/510 have a designated port face mounting surface 434*a*/474*a*/514*a* having an annular recess 433/473/513 formed therein designed to receive an "O" ring which seals the block connector on a desired port face 24.

The connectors 430/470/510 have two pairs of through bores 437/477/517 diagonally located on opposed sides of the port 432/472/512. A four-bolt flanged connector 130 or additional block connector can be fastened to or "stacked" on the stacking surface 474*b*/514*b* by inserting fastening bolts through the through bores 477/517, and into threaded bores on a desired port face 24. Four-bolt flanged connectors 130 can also be mounted on the mounting surfaces 434*c*/ 474*c*/514*c*,514*d* which have threaded bores 436/476/516 diagonally located on opposite sides of the port 432/472/ 512.

FIGS. 29–31 illustrate that the width W2 of the mounting surfaces 434*c*/474*c*/514*c*,514*d* is less than the recommended pad width FF established in SAE standard J518. Preferably, the width of the mounting surfaces 434*c*/474*c*/514*c*,514*d* is equal to EE but may be less than EE provided the width of the mating flange connector 130 is less than the width W2 of the mounting surface. FIGS. 29–31 also illustrate that the port face mounting surface 434*a*/474*a*/514*a* is wider than the dimension EE. Otherwise, the through bores 437/477/ 517 and the threaded bores 436/476/516 would intersect and interfere with one another.

Figure 32:
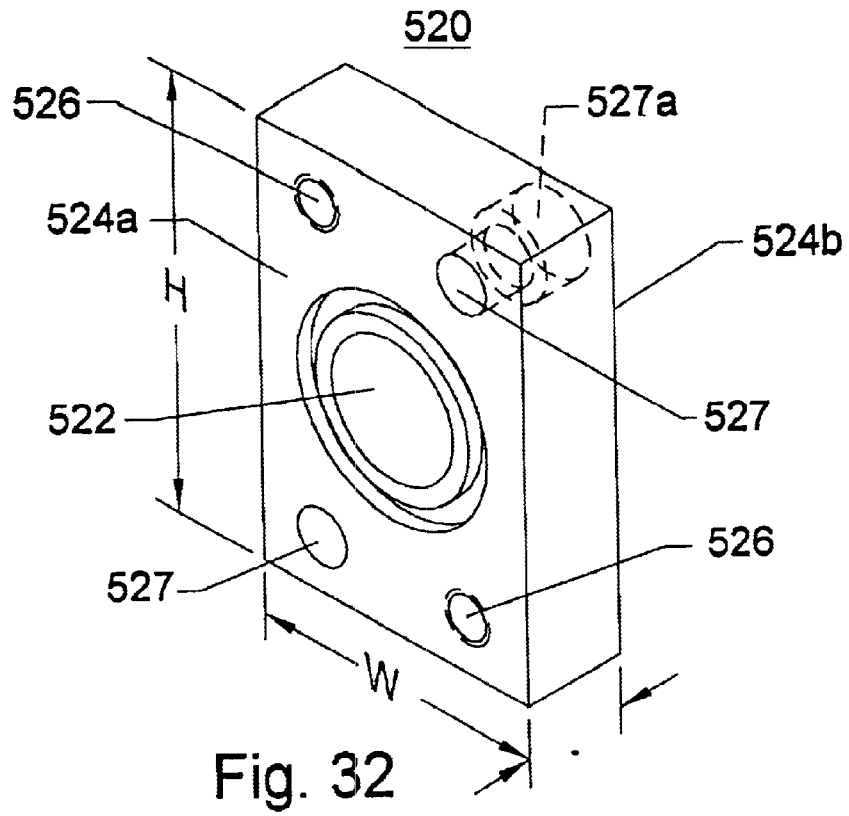
FIGS. 32 and 33 are perspective views of integral adapters in accordance with an embodiment of the invention.
Figure 33:
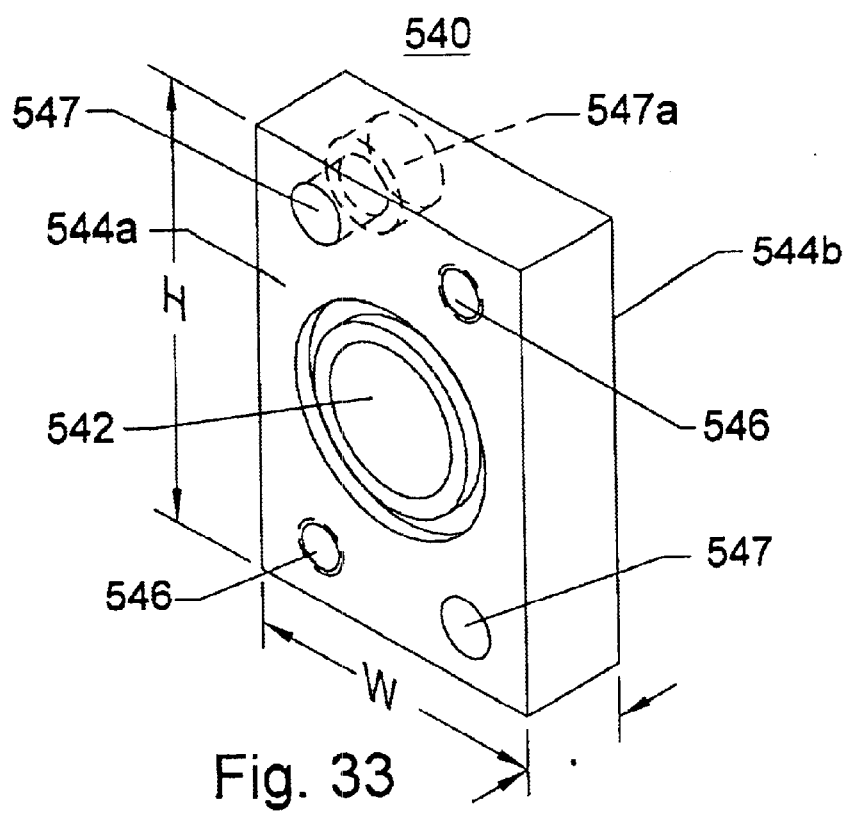

FIGS. 32 and 33 illustrate adapters in accordance with an embodiment of the invention. The adapters 520/540 are used to retain two-bolt or four-bolt sandwich modules and provide a two-bolt flange port for adding new components to the fluid-flow circuit. The adapters 520/540 are also used to adapt to the alternate two-port tapped locations.

The adapters 520/540 have a single-piece, block construction with a central port 522/542 extending therethrough. The central port 522/542 extends through the adapter from a port face mounting surface 524*a*/544*a* to a mounting surface 524*b*/544*b*. Each adapter 520/540 has a pair of threaded bores 526/546 diagonally located on opposed sides of the central port.

The adapters also include a pair of through bores 527/547 diagonally located on opposed sides of the central port and extending entirely through the adapters 520/540. One end of the aperture has an enlarged-diameter counterbore 527*a*/ 547*a* formed in one of the port face mounting surfaces 524*b*/544*b*.

Figure 36:
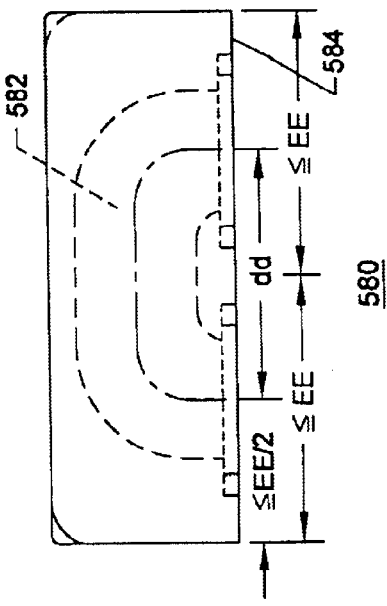
FIG. 36 is a top plan view of a 180-degree flow turn around block modular connector in accordance with an embodiment of the invention.
Figure 37:
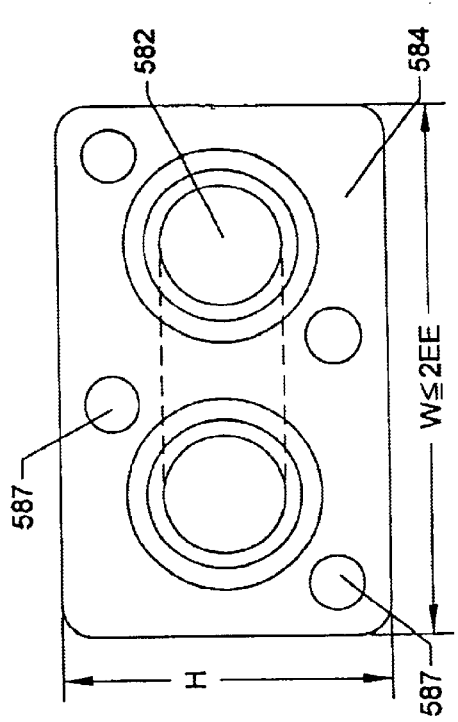
FIG. 37 is a front elevational view of the connector shown in FIG. 36.
Figure 34:
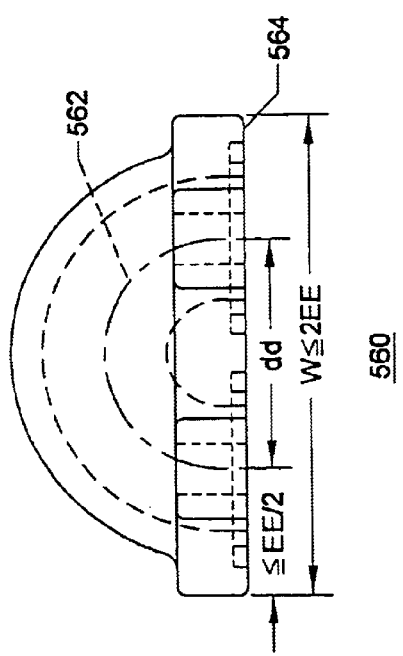
FIG. 34 is a top plan view of a 180-degree flow turn around flanged modular connector in accordance with an embodiment of the invention.
Figure 35:
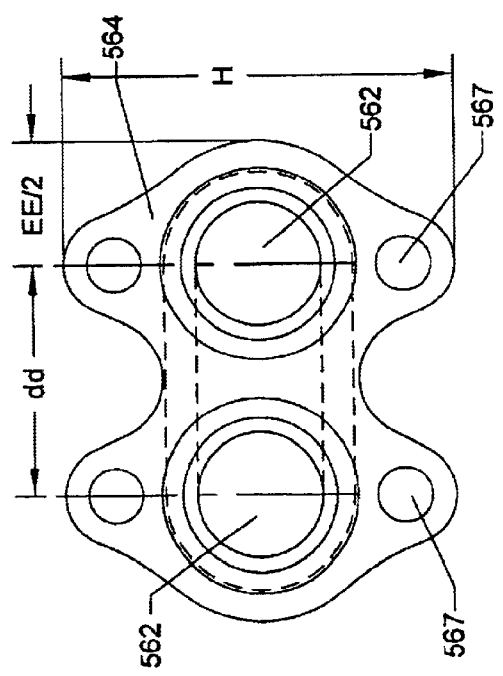
FIG. 35 is a front elevational view of the connector shown in FIG. 34.

FIGS. 34–44 illustrate further connectors in accordance with the present invention. FIGS. 34–35 illustrate a 180-degree flow turn around flanged modular connector 560. FIGS. 36–37 illustrate a 180-degree flow turn around block modular connector 580.

The one-piece, 180-degree flow turn around connectors 560/580 have a single port face mounting surface 564/584 having a width W and a height H. Input and output fluid-ports are located on the port face mounting surface and a 180-degree fluid-flow channel 562/582 connects the input and output ports. The ports have a nominal diameter D1 at the port face mounting surface.

The flanged connector 560 has a height H which is slightly larger than O. The block connector 580 has a height H which is less than or equal to O.

Each connector 560/580 has a pair of through bores 567/587 diagonally located on opposed sides of the input port and output port. The through bores 567/587 receive bolts for mounting the connectors 560/580 to a port face.

FIGS. 34–37 illustrate that the width W of the 180-degree flow turn around connectors 560/580 is less than twice the dimension FF, preferably less than twice the minimum pad width EE of SAE standard J518 described in detail above. The port centers are separated by the dimension dd. The dimension dd is less than FF, and preferably equal to EE. The dimension dd may also be less than EE provided the width W of the connector attached thereto is less than the dimension dd. For example, the turn around connectors 560/580 can be mounted on two adjacently-connected (stacked) block connectors such as described above having the pad width EE or on a block connector having an enlarged width and multiple fluid-flow ports (described below).

FIGS. 38–39 illustrate an offset flow modular block connector 600 in accordance with an embodiment of the invention. The offset flow connector 600 has a single-piece, block construction similar to the turn around block connector 580 described above except that the central channel extends inwardly from a first port face mounting surface 604a and exits through a second port face mounting surface 604b. While the overall width W of the connector 580 is greater than 2 times EE, the connector 580 can be connected to two fluid flow ports 6 separated by the port dimension dd. The dimension dd is less than FF, and preferably equal to EE. The dimension dd may also be less than EE provided the width W of the flanged connector attached thereto is less than the dimension dd.

FIGS. 40–41 illustrate an in-line divide flow/combine flow modular connector 620. The connector 620 has a single-piece, block construction with a central channel 622 extending inwardly from an input port face mounting surface 624a, dividing internally into two separate channels which exit on an opposed port face mounting surface 624b. The connector 620 has a pair of through bores 627 diagonally located on opposed sides of each port on the exit port face mounting surface 624b. The through bores 627 receive connecting bolts for mounting the connector to a port face, flange connector, or block connector. The connector 620 also has a pair of threaded bores 626 diagonally located on opposed sides of the port on the input port face mounting surface 624a.

The width W of the connector is preferably equal to, but may be less than, 2⅓ times EE. The ports on the output port face 624b are separated by the distance dd which is preferably equal to, but may be less than, 1⅓ EE.

Figure 42:
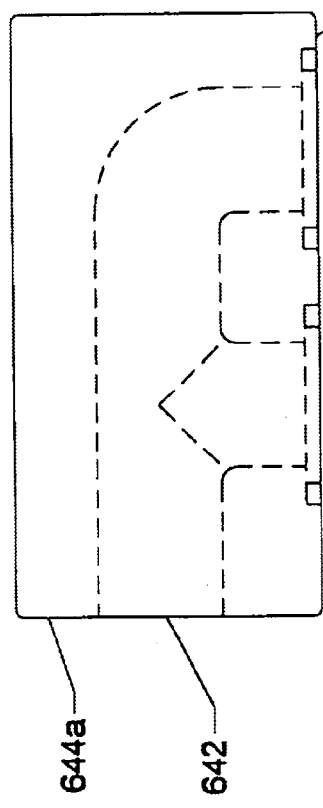
FIG. 42 is a top plan view of a right angle divide flow/combined flow modular connector in accordance with an embodiment of the invention.
Figure 44:
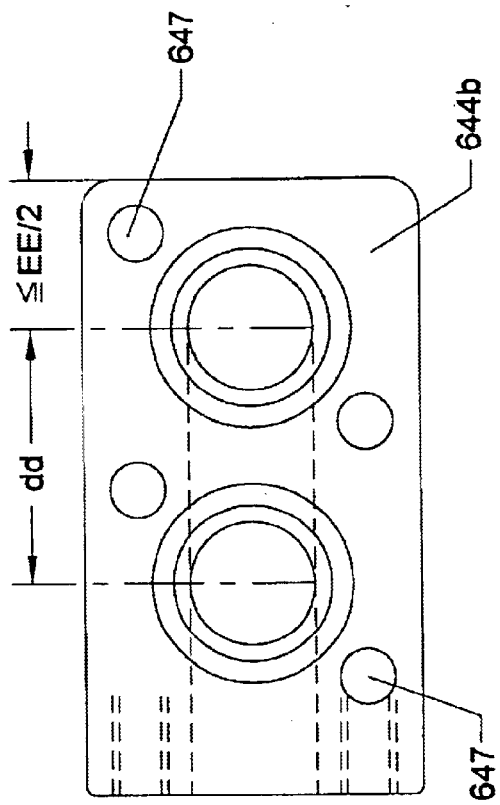
FIG. 44 is a front elevational view of the connector shown in FIG. 42.
Figure 43:
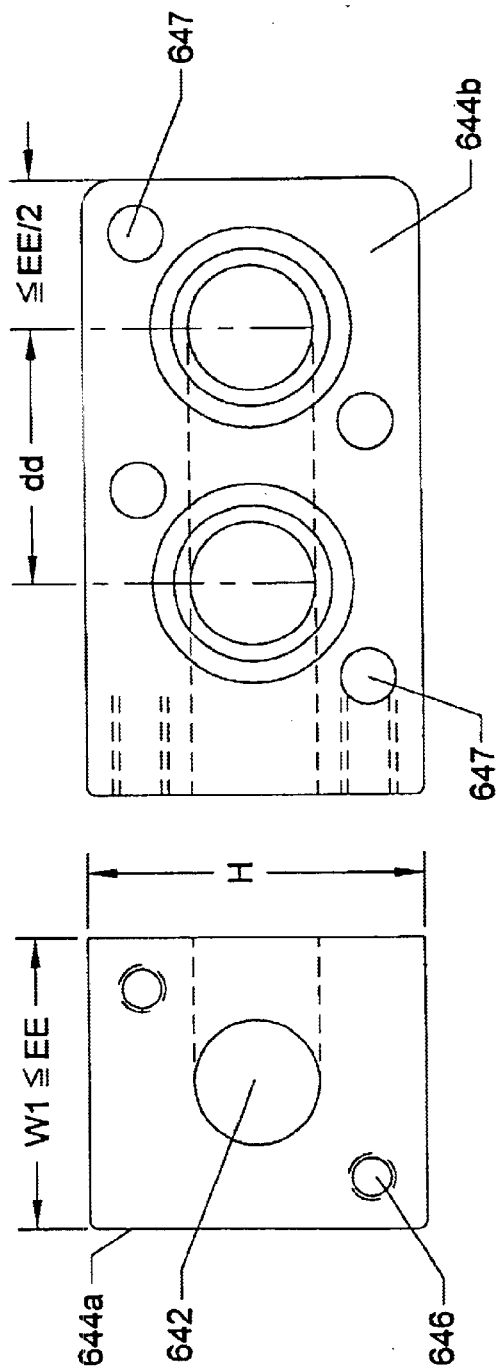
FIG. 43 is a side elevational view of the connector shown in FIG. 42.

FIGS. 42–44 illustrate a right angle divide flow/combine flow modular connector 640. The connector 640 has a single-piece, block construction with a central channel extending inwardly from a first port face mounting surface 644a, dividing internally into two separate channels which exit on a second port face mounting surface 644b. The connector 640 has a pair of through bores 647 diagonally located on opposed sides of each port on the exit port face mounting surface 644b. The apertures receive connecting bolts for mounting the connector 640 to a port face. The connector 640 also has a pair of threaded bores 646 diagonally located on opposed sides of the port on the input port face mounting surface 644a.

FIGS. 42–44 illustrate that the width of the first port face mounting surface 644a of the connector 640 is less than FF, preferably less than or equal to the minimum pad width EE of SAE standard J518 described in detail above. FIGS. 42–44 also illustrate that the distance between the ports centers on the second port face mounting surface is equal to dd. The dimension dd is preferably equal to or less than EE. For example, the connector 640 can be mounted on two adjacently-connected (stacked) block connectors such as described above having the minimum pad width EE.

Figure 45:
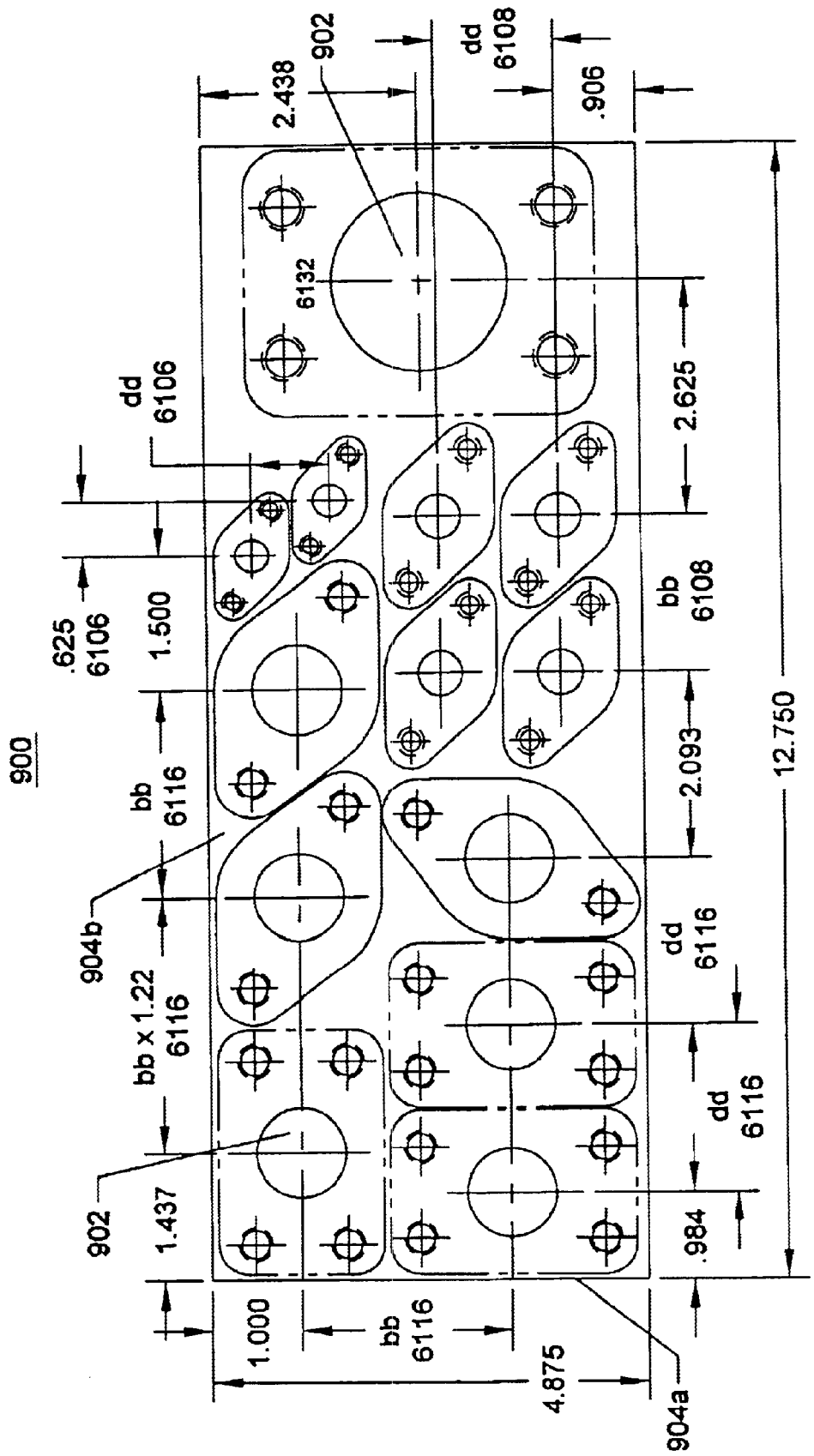
FIG. 45 is a front plan view of a connector having multiple, interconnected fluid flow ports having different sizes.

Except in FIG. 45, the modular connectors are illustrated and described wherein all the fluid-flow channels have a constant diameter along its length and the ports have the same nominal diameter D1. However, it should be appreciated to one of ordinary skill in the art that the modular connectors may have a converging or diverging fluid flow channel and a plurality of ports having different nominal diameters. In such a case, the height H of the connector is determined by the diameter of the largest port in the connector. The width W1 and W2 of the connector are determined by the port diameter, or combination of port diameters, on the respective mounting surfaces. Typically, the width W1 is determined by the largest port diameter.

The embodiments shown in FIGS. 34–44 can be made to accept a four-bolt flanged connector 130 by adding additional threaded fastening bores. In such embodiments, the dimensions shown in FIGS. 34–44 would be the same except for the embodiment shown in FIGS. 40 and 41. A four-bolt in-line divide flow/combine flow modular connector would have a width W less than or equal to 3 times EE and the dimension dd would be equal to 2 times EE.

FIG. 45 illustrates a modular block connector 900 having multiple interconnected fluid-flow channels 902 having different diameters. The connector 900 has a single-piece, block construction with a fluid-flow channel extending inwardly from a first port face mounting surface 904a to a second port face mounting surface 904b having multiple ports thereon. FIG. 45 illustrates how several two-bolt and four-bolt flange connectors having different sizes can be fastened to and nested on the second port face mounting surface 904b. FIG. 45 illustrates various dimensions between port centers corresponding to various sizes specified in SAE standard J518. The four digit code underneath the various dimensions represents the pressure series and size of the port as designated in SAE standard J518.

The flanged and block connectors described above are combined to form a compact fluid flow system. The fasteners employed in connecting either the flanged connectors or modular block connectors described above should have a minimum tensile yield of 155,000 p.s.i. which is higher than the Grade 5 minimum allowed by SAE standard J518.

What is claimed is:

1. A one-piece, flanged, fluid-flow connector for connecting tube, pipe, hose or the like to a port face, said connector comprising:

a) a base having a generally flat port face mounting surface on one end, and a connection piece fixed to and extending from the other end of said base, b) at least four mounting tabs fixed to and extending outwardly from said base, each of said tabs having an aperture extending therethrough, c) a central, elongate, cylindrical channel extending lengthwise through said connector from a port on said mounting surface to a port on said connection piece, wherein said base has a reinforcement portion, said connection piece being contiguously formed with and extending from said reinforcement portion, wherein said reinforcement portion comprises a generally conical extension intermediate said tabs and said connection piece, wherein said conical extension transitions continuously from a lesser thickness adjacent one of said tabs to a greater thickness adjacent to said connection piece.

2. The connector of claim 1, wherein said reinforcement portion comprises ribs intermediate said tabs and said connection piece.

3. The connector of claim 2, wherein said ribs are defined by a region of reduced thickness of the reinforcement portion, said region of reduced thickness being located adjacent to said connection piece and generally equidistant from said tabs.

4. The connector of claim 3, wherein said reinforcement portion comprises a cut-out portion in an area between said tabs and said connection piece.

5. The connector of claim 1, wherein said reinforcement portion comprises a cut-out portion in an area between said tabs and said connection piece.

6. The connector of claim 1, wherein said port face has an annular recess formed therein constructed and arranged to receive an O-ring to seal the connector on a desired port face.

7. The connector of claim 1, wherein said connection piece has a threaded outer surface for releasable interconnection with a desired tube, pipe, hose or the like.

8. The connector of claim 1, wherein the connector has two tabs diametrically opposed from one another on opposed sides of said port.

9. The connector of claim 1, wherein the connection piece is bent to change a direction of fluid flow.

10. The connector of claim 1, wherein the connector has a maximum working pressure of at least 3000 psi.

11. The connector of claim 1, wherein the connector has a maximum working pressure of at least 5000 psi.

12. A one-piece, flanged, fluid-flow connector for connecting tube, pipe, hose or the like to a port face, said connector comprising:
   a) a base having a generally flat port face mounting surface on one end, and a connection piece fixed to and extending from the other end of said base,
   b) at least four mounting tabs fixed to and extending outwardly from said base, all of said tabs having an aperture extending therethrough,
   c) a central, elongate, cylindrical channel extending lengthwise through said connector from a port on said mounting surface to a port on said connection piece,
   wherein said base has at least one reinforcement portion, said connection piece being contiguously formed with and extending from said reinforcement portion,
   wherein said reinforcement portion comprises a generally conical extension intermediate one of said tabs and said connection piece, wherein said conical extension transitions continuously from a lesser thickness adjacent one of said tabs to a greater thickness adjacent to said connection piece, and
   wherein the connector has a maximum working pressure of at least 3000 psi.

13. The connector of claim 12, wherein the connector has a maximum working pressure of at least 5000 psi.

14. A fluid-flow connector for connecting tube, pipe, hose or the like to a port face, comprising:
   a base having a central port and at least four tabs disposed around the central port, each tab including an aperture, the base having a width W,
   wherein pairs of non-adjacent apertures are spaced apart by a distance designated as Z,
   wherein a ratio Z/(W/2) is in a range of about 2.36 to about 2.67.

15. The connector of claim 14, wherein the ratio Z/(W/2) is in a range of about 248 to about 2.61.

16. The connector of claim 14, wherein:
   a) said base has a generally flat port face mounting surface on one end, and a connection piece fixed to and extending from the other end of said base,
   b) the connector includes a central, elongate, cylindrical channel extending lengthwise through said connector from a port on said mounting surface to a port on said connection piece,
   c) said base has a reinforcement portion, said connection piece being contiguously formed with and extending from said reinforcement portion, and
   d) said reinforcement portion comprises a generally conical extension intermediate said tabs and said connection piece, wherein said conical extension transitions continuously from a lesser thickness adjacent one of said tabs to a greater thickness adjacent to said connection piece.

17. The connector of claim 16, wherein said reinforcement portion comprises ribs intermediate said tabs and said connection piece.

18. The connector of claim 17, wherein said ribs are defined by a region of reduced thickness of the reinforcement portion, said region of reduced thickness being located adjacent to said connection piece and generally equidistant from said tabs.

19. The connector of claim 18, wherein said reinforcement portion comprises a cut-out portion in an area between said tabs and said connection piece.

20. The connector of claim 16, wherein said reinforcement portion comprises a cut-out portion in an area between said tabs and said connection piece.

21. The connector of claim 16, wherein said port face has an annular recess formed therein constructed and arranged to receive an O-ring to seal the connector on a desired port face.

22. The connector of claim 16, wherein said connection piece has a threaded outer surface for releasable interconnection with a desired tube, pipe, hose or the like.

23. The connector of claim 16, wherein the connection piece is bent to change a direction of fluid flow.

24. The connector of claim 16, wherein the connector has a maximum working pressure of at least 3000 psi.

25. The connector of claim 16, wherein the connector has a maximum working pressure of at least 5000 psi.

* * * * *